(12) United States Patent
Guvenkaya et al.

(10) Patent No.: US 10,305,651 B2
(45) Date of Patent: May 28, 2019

(54) SUPERPOSED SIGNALING FOR BANDWIDTH EFFICIENCY

(71) Applicants: IDAC Holdings, Inc., Wilmington, DE (US); University of South Florida, Tampa, FL (US)

(72) Inventors: Ertugrul Guvenkaya, Tampa, FL (US); Rui Yang, Greenlawn, NY (US); Erdem Bala, East Meadow, NY (US); Huseyin Arslan, Tampa, FL (US)

(73) Assignees: University of South Florida, Tampa, FL (US); IDAC Holdings, Inc., Wilmington, DE (US)

( * ) Notice: Subject to any disclaimer, the term of this patent is extended or adjusted under 35 U.S.C. 154(b) by 61 days.

(21) Appl. No.: 14/875,459

(22) Filed: Oct. 5, 2015

(65) Prior Publication Data

US 2016/0100414 A1   Apr. 7, 2016

Related U.S. Application Data

(60) Provisional application No. 62/059,667, filed on Oct. 3, 2014.

(51) Int. Cl.
*H04L 5/00* (2006.01)
*H04L 27/26* (2006.01)
(Continued)

(52) U.S. Cl.
CPC .......... *H04L 5/0048* (2013.01); *H04J 11/003* (2013.01); *H04L 27/0008* (2013.01);
(Continued)

(58) Field of Classification Search
None
See application file for complete search history.

(56) References Cited

U.S. PATENT DOCUMENTS

| 5,862,173 A   * | 1/1999 | Dent | H04J 13/00 375/149 |
| 2006/0050664 A1 * | 3/2006 | Guey | H04L 5/003 370/329 |

FOREIGN PATENT DOCUMENTS

WO   WO-2009157848 A1 * 12/2009 ............. H04B 1/712

OTHER PUBLICATIONS

Farhang-Boroujeny, "OFDM Versus Filter Bank Multicarrier", Signal Processing Magazine, IEEE, vol. 28, No. 3, May 2011, pp. 92-112.
(Continued)

*Primary Examiner* — Sulaiman Nooristany
(74) *Attorney, Agent, or Firm* — Invention Mine LLC

(57) ABSTRACT

Systems, methods and instrumentalities are disclosed for superposed signaling for bandwidth efficiency in wireless communications. Homogeneous and heterogeneous signals may be superposed on the same channel. Superposed signals may comprise, for example, multi carrier, frequency division and code division signals, including multiple access, e.g., OFDMA and CDMA, signals. Data for various receivers may be dynamically selected for signal superpositioning, for example, based on radio access technology, communication rate (e.g. high and low rates), distance between transmitter and receiver (e.g. near and far signals). Communication rate and power may be allocated to superposed signals. Interference nulling may be applied, for example, by selecting or excluding spreading codes and/or subcarriers. Nulled locations may be used to transmit critical information. Interference shaping may be applied to modify interference, e.g., by transmitting interference symbols using reserved spreading codes. Support information, e.g., code indices, code length and/or subcarriers, may be signaled to support or optimize performance.

16 Claims, 21 Drawing Sheets

(51) Int. Cl.
*H04L 27/00* (2006.01)
*H04J 11/00* (2006.01)
*H04L 27/20* (2006.01)
*H04L 27/36* (2006.01)

(52) U.S. Cl.
CPC ...... *H04L 27/2602* (2013.01); *H04L 27/2697* (2013.01); *H04J 2011/0006* (2013.01); *H04L 5/0023* (2013.01); *H04L 5/0069* (2013.01); *H04L 27/2042* (2013.01); *H04L 27/362* (2013.01)

(56) References Cited

OTHER PUBLICATIONS

Sahin et al., "A Survey on Multicarrier Communications: Prototype Filters, Lattice Structures, and Implementation Aspects", Available at http://arxiv.org/pdf/1212.3374.pdf , Jul. 12, 2013, 27 Pages.
Tse et. Al., "Fundamentals of Wireless Communication", Chapter 6, Multiuser capacity and opportunistic communication, pp. 228-240, Cambridge University Press, 2005.

* cited by examiner

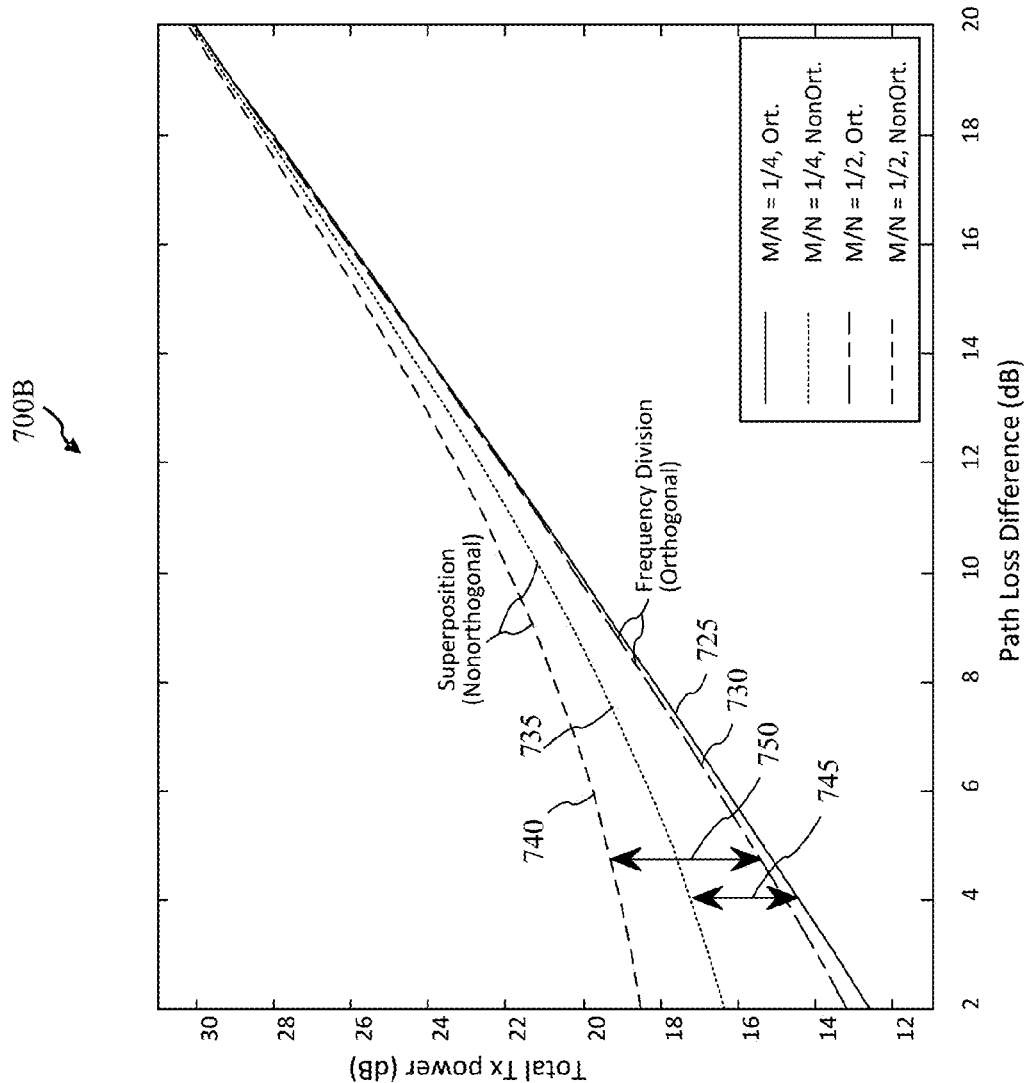
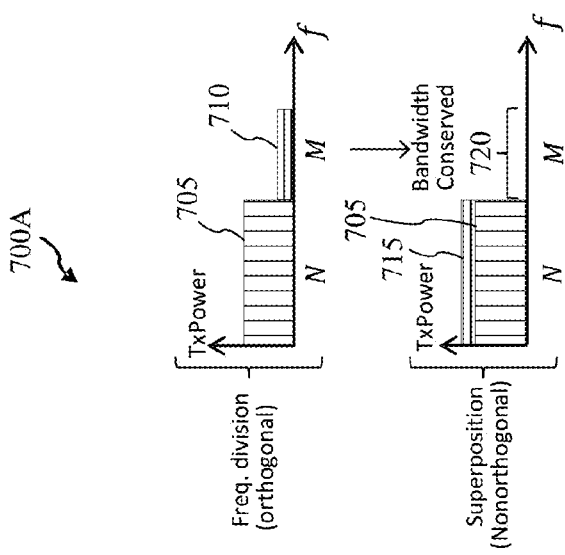
FIG. 7B
FIG. 7A

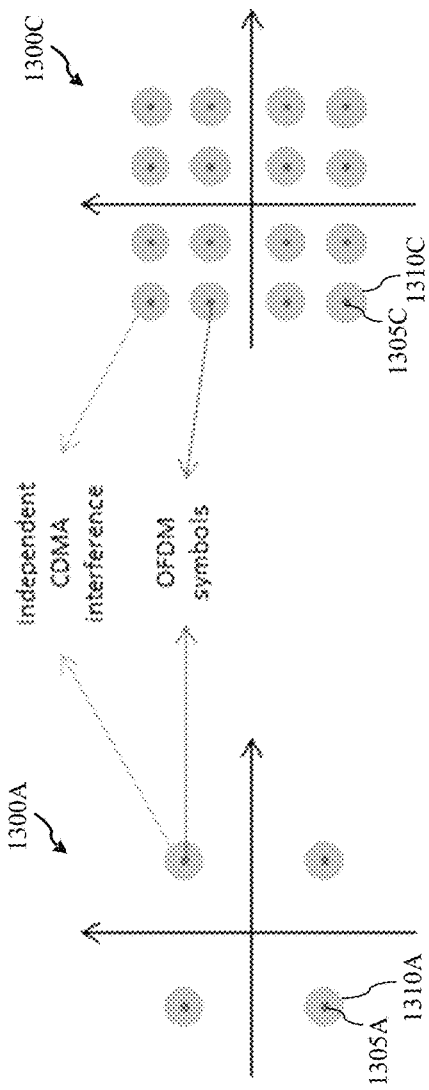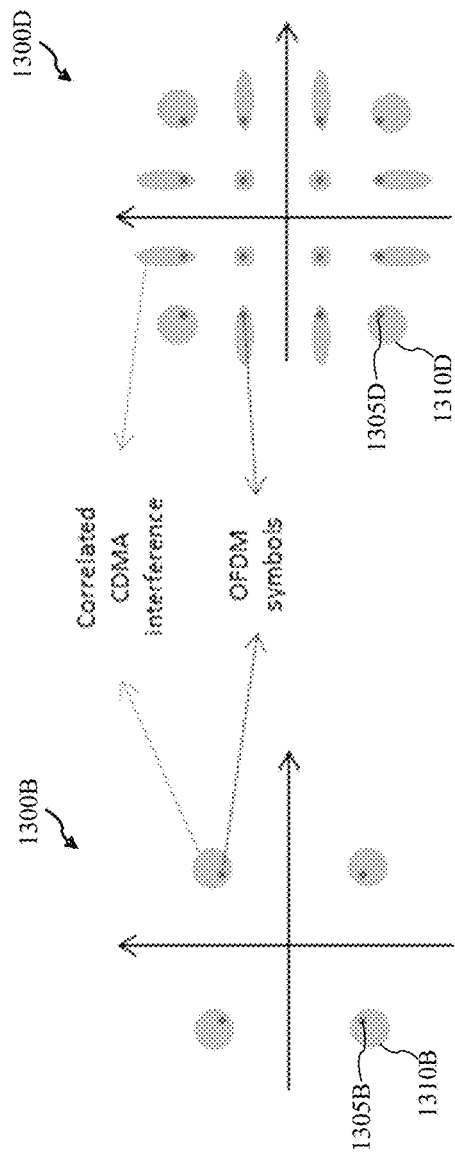

SUPERPOSED SIGNALING FOR BANDWIDTH EFFICIENCY

CROSS REFERENCE TO RELATED APPLICATIONS

This application claims priority to U.S. Provisional Patent Application No. 62/059,667, filed on Oct. 3, 2014, and entitled "Superposed Signaling for Bandwidth Efficiency in Mixed Traffic Communications," the entirety of which is incorporated by reference as if fully set forth herein.

BACKGROUND

Wireless spectrum, given its natural limitation, is under increasing pressure from an increasing number of communications by an increasing number of users, wireless communication devices and applications with access to an increasing amount of information, services and things on the expanding Internet of Things (IoT). Applications using wireless spectrum vary from long-range high power applications to short-range low power applications.

Wireless mass communication systems, present (e.g. 4G) and future (e.g. 5G), provide a tremendous number of connections and throughput in heterogeneous networks. Wireless mass communication systems support a wide variety of traffic types to support a vast number of applications within available wireless spectrum. Applications using wireless spectrum include machine to machine (M2M) communications, smart metering, bio-telemetry, etc.

SUMMARY

Systems, methods and instrumentalities are disclosed for superposed signaling for bandwidth efficiency in wireless communications. Homogeneous and heterogeneous signals may be superposed on the same channel. Superposed signals may comprise, for example, multi carrier, frequency division and code division signals, including multiple access, e.g., orthogonal frequency division multiple access (OFDMA) and code division multiple access (CDMA), signals. Data for various receivers may be dynamically selected for signal superpositioning, for example, based on radio access technology, communication rate (e.g. high and low rates), distance between transmitter and receiver (e.g. near and far signals). Communication rate and power may be allocated to superposed signals. Interference nulling may be applied, for example, by selecting or excluding spreading codes and/or subcarriers. Nulled locations may be used to transmit critical information, e.g. reference or pilot information. Interference shaping may be applied to modify interference, e.g., by transmitting interference symbols using reserved spreading codes. Interference cancellation information, e.g., code indices, code length and/or subcarriers, may be signaled to the receiving units for interference cancellation.

BRIEF DESCRIPTION OF THE DRAWINGS

The drawings, summary, detailed description and claims individually and collectively present non-limiting examples. Each figure represents a different example with different numbering.

FIG. 7A illustrates a benefit provided by superposed signaling relative to bandwidth usage and preservation.

FIG. 7B illustrates an example of total transmission power for superposed signaling relative to a difference in path loss for near and far signals.

FIG. 13A illustrates an example of QPSK (4QAM) constellations of an OFDM signal and interference by an uncorrelated CDMA signal.

FIG. 13B illustrates QPSK (4QAM) constellations of an OFDM signal and interference by a correlated CDMA signal.

FIG. 13C illustrates an example of 16QAM constellations of an OFDM signal and interference by an uncorrelated CDMA signal.

FIG. 13D illustrates 16QAM constellations of an OFDM signal and interference by a correlated CDMA signal.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
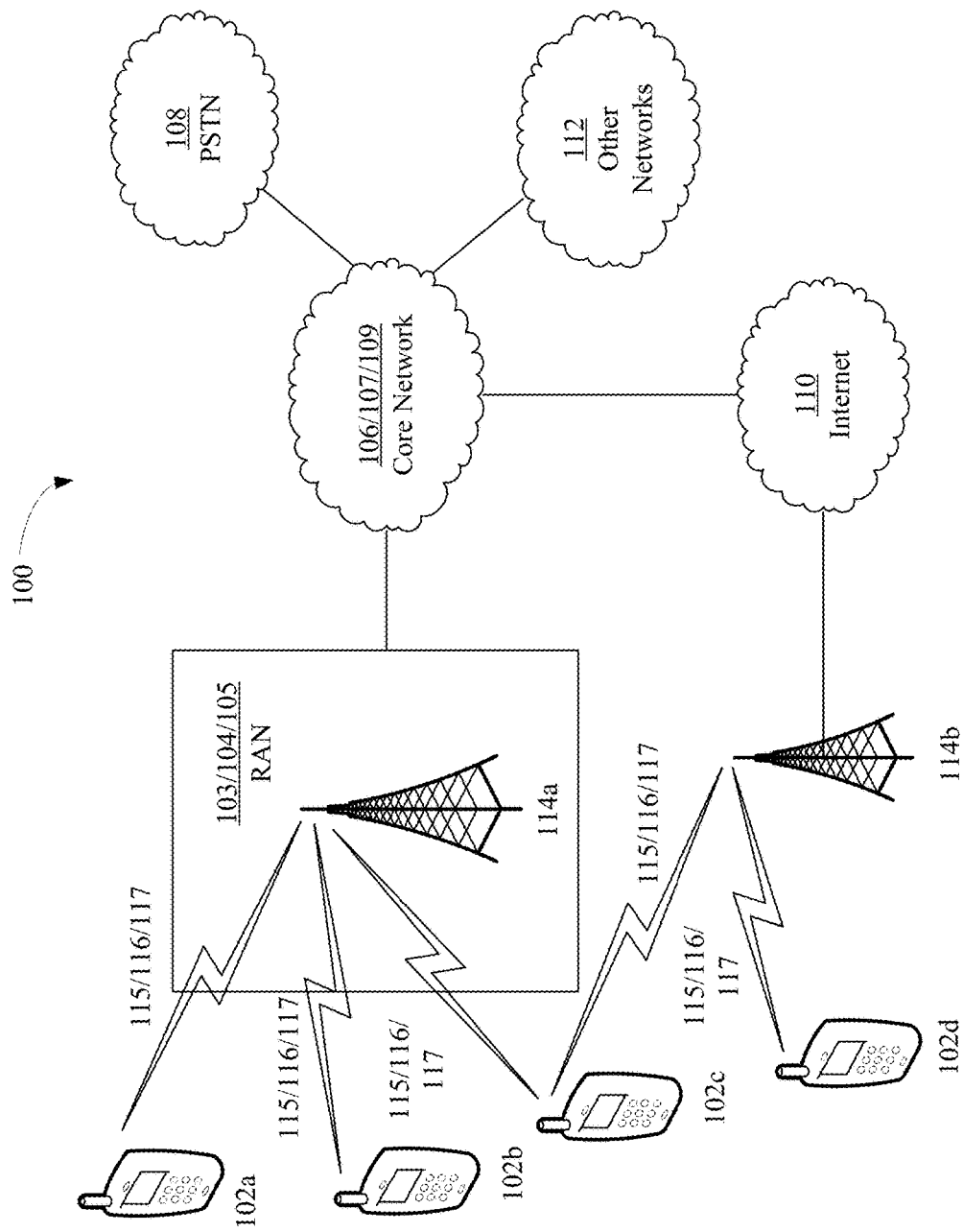
FIG. 1A is a system diagram of an example communication system.

FIG. 1A is a system diagram of an example communication system. Communication system 100 may be a multiple access system that provides content, such as voice, data, video, messaging, broadcast, etc., to multiple wireless users. Communications system 100 may enable multiple wireless users to access such content through the sharing of system resources, including wireless bandwidth. For example, communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

Communications system 100 may include wireless transmit/receive units (WTRUs), e.g., UEs, 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. A WTRU, e.g., WTRUs 102a, 102b, 102c, 102d, may be any type of device configured to operate and/or communicate in a wireless environment. By way of example, WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

Communications system 100 may comprise one or more base stations, e.g., base station 114a and base station 114b. Base stations 114a, 114b may be any type of device configured to wirelessly interface with at least one of WTRUs 102a, 102b, 102c, 102d, for example, to facilitate access to one or more communication networks, such as the core network 106/107/109, the Internet 110, and/or the networks 112. Base stations 114a, 114b may be, for example, a base transceiver station (BTS), a Node-B, an eNode B, a Home Node B, a Home eNode B, a site controller, an access point (AP), a wireless router, and the like. While base stations 114a, 114b are each depicted as a single element, base stations 114a, 114b may comprise any number of interconnected base stations and/or network elements.

Base station 114a may be part of RAN 103/104/105, which may comprise other base stations and/or network elements (not shown), such as a base station controller (BSC), a radio network controller (RNC), relay nodes, etc. Base station 114a and/or base station 114b may be configured to transmit and/or receive wireless signals within a particular geographic region, which may be referred to as a cell (not shown). A cell may further be divided into cell sectors. For example, a cell associated with the base station 114a may be divided into three sectors. Base station 114a may comprise multiple (e.g. three) transceivers, e.g., one for each sector of the cell. Base station 114a may employ multiple-input multiple output (MIMO) technology and/or may utilize multiple transceivers for each sector of the cell.

Base stations 114a, 114b may communicate with one or more WTRUs 102a, 102b, 102c, 102d over an air interface 115/116/117, which may be any suitable wireless communication link (e.g. radio frequency (RF), microwave, infrared (IR), ultraviolet (UV), visible light, etc.). Air interface 115/116/117 may be established using any suitable radio access technology (RAT).

Communications system 100 may be a multiple access system and may employ one or more channel access schemes, such as CDMA, TDMA, FDMA, OFDMA, SC-FDMA, and the like. In an example, base station 114a in RAN 103/104/105 and WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may comprise communication protocols, such as High-Speed Packet Access (HSPA) and/or Evolved HSPA (HSPA+). HSPA may comprise High-Speed Downlink Packet Access (HSDPA) and/or High-Speed Uplink Packet Access (HSUPA).

Base station 114a and WTRUs 102a, 102b, 102c may implement a radio technology such as Evolved UMTS Terrestrial Radio Access (E-UTRA), which may establish air interface 115/116/117 using Long Term Evolution (LTE) and/or LTE-Advanced (LTE-A).

Base station 114a and WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

Base station 114b may be a wireless router, Home Node B, Home eNode B, or access point, for example. Base station 114b may utilize any suitable RAT for facilitating wireless connectivity in a localized area, such as a place of business, a home, a vehicle, a campus, and the like. Base station 114b and WTRUs 102c, 102d may implement a radio technology such as IEEE 802.11 to establish a wireless local area network (WLAN). Base station 114b and WTRUs 102c, 102d may implement a radio technology such as IEEE 802.15 to establish a wireless personal area network (WPAN). Base station 114b and WTRUs 102c, 102d may utilize a cellular-based RAT (e.g. WCDMA, CDMA2000, GSM, LTE, LTE-A, etc.) to establish a picocell or femtocell. Base station 114b may have a direct connection to the Internet 110. Base station 114b may or may not access the Internet 110 via the core network 106/107/109.

RAN 103/104/105 may be in communication with core network 106/107/109, which may be any type of network configured to provide voice, data, applications, and/or voice over internet protocol (VoIP) services to one or more WTRUs 102a, 102b, 102c, 102d. In an example, core network 106/107/109 may provide call control, billing services, mobile location-based services, pre-paid calling, Internet connectivity, video distribution, etc. Core network 106/107/109 may perform high-level security functions, such as user authentication. Although not shown in FIG. 1A, RAN 103/104/105 and/or core network 106/107/109 may be in direct or indirect communication with other RANs that employ the same RAT as the RAN 103/104/105 or a different RAT. For example, in addition to being connected to RAN 103/104/105, which may be utilizing an E-UTRA radio technology, core network 106/107/109 may be in communication with another RAN (not shown) employing a GSM radio technology.

Core network 106/107/109 may serve as a gateway for WTRUs 102a, 102b, 102c, 102d to access PSTN 108, Internet 110 and/or other networks 112. PSTN 108 may comprise circuit-switched telephone networks that provide plain old telephone service (POTS). Internet 110 may comprise a global system of interconnected computer networks and devices that use common communication protocols, such as transmission control protocol (TCP), user datagram protocol (UDP) and internet protocol (IP) in a TCP/IP internet protocol suite. Networks 112 may comprise wired and/or wireless communications networks owned and/or operated by other service providers. For example, networks 112 may comprise another core network connected to one or more RANs, which may employ the same RAT as the RAN 103/104/105 or a different RAT.

Some or all WTRUs 102a, 102b, 102c, 102d in communications system 100 may have multi-mode capabilities. In an example, WTRUs 102a, 102b, 102c, 102d may have multiple transceivers for communicating with different wireless networks over different wireless links. For example, WTRU 102c may be configured to communicate with base station 114a, which may employ a cellular-based radio technology, and with the base station 114b, which may employ an IEEE 802 radio technology.

Figure 1B:
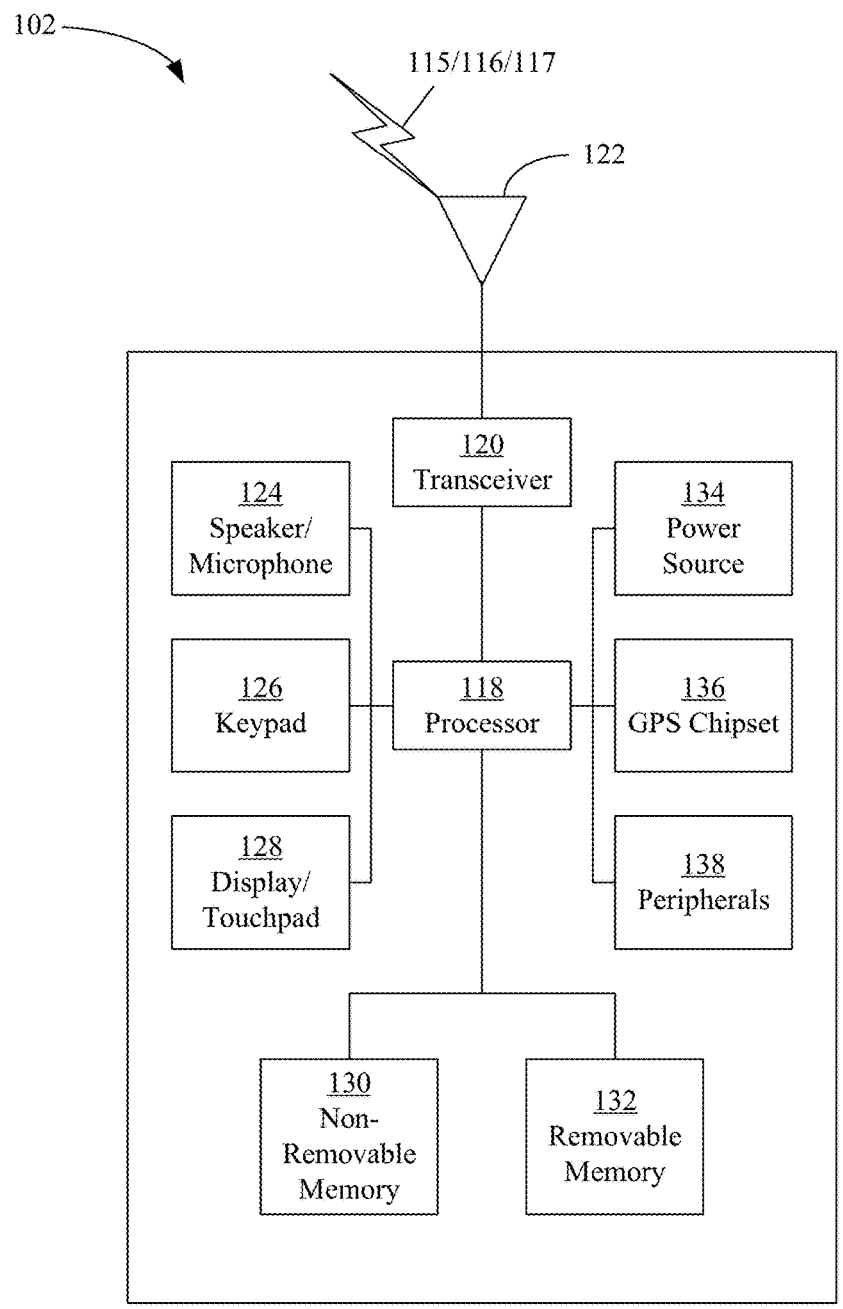
FIG. 1B is a system diagram of an example wireless transmit/receive unit (WTRU) that may be used in a communication system.

FIG. 1B is a system diagram of an example of WTRU 102. WTRU 102 may have one or more of a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. Base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may have one or more of the elements depicted in FIG. 1B and described herein.

Processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 118 may perform signal coding, data processing, power control, input/output processing, and/or any other functionality that enables WTRU 102 to operate in a wireless environment. Processor 118 may be coupled to the transceiver 120, which may be coupled to transmit/receive element 122. Although FIG. 1B depicts processor 118 and transceiver 120 as separate components, they may be integrated together, in whole or in part, in an electronic package or chip.

Transmit/receive element 122 may be configured to transmit signals to, or receive signals from, a base station (e.g. base station 114a) over the air interface 115/116/117. In an example, transmit/receive element 122 may be an antenna configured to transmit and/or receive RF signals. Transmit/receive element 122 may be an emitter/detector configured to transmit and/or receive IR, UV, or visible light signals. Transmit/receive element 122 may be configured to transmit and receive both RF and light signals. Transmit/receive element 122 may be configured to transmit and/or receive any combination of wireless signals.

Although transmit/receive element 122 is depicted in FIG. 1B as a single element, WTRU 102 may have any number of transmit/receive elements 122. WTRU 102 may employ MIMO technology. WTRU 102 may have two or more transmit/receive elements 122 (e.g. multiple antennas) for transmitting and receiving wireless signals over air interface 115/116/117.

Transceiver 120 may be configured to modulate signals that are to be transmitted by transmit/receive element 122 and to demodulate signals that are received by transmit/receive element 122. WTRU 102 may have multi-mode capabilities. Transceiver 120 may have multiple transceivers for enabling the WTRU 102 to communicate via multiple RATs, such as UTRA and IEEE 802.11.

Processor 118 of WTRU 102 may be coupled to, and may receive user input data from one or more input components, such as speaker/microphone 124, keypad 126 and/or display/touchpad 128 (e.g. a liquid crystal display (LCD) display unit or organic light-emitting diode (OLED) display unit). Processor 118 may output user data to one or more output components, such as speaker/microphone 124, keypad 126 and/or the display/touchpad 128. Processor 118 may access information from, and store data in, any type of suitable memory, such as non-removable memory 130 and/or removable memory 132. Non-removable memory 130 may have random-access memory (RAM), read-only memory (ROM), a hard disk and/or any other type of memory storage device. Removable memory 132 may have a subscriber identity module (SIM) card, a memory stick, a secure digital (SD) memory card and the like. Processor 118 may access information from, and store data in, memory that is not physically located on the WTRU 102, such as on a server or a home computer (not shown).

Processor 118 may receive power from power source 134. Processor 118 may be configured to distribute and/or control power to other components in the WTRU 102. Power source 134 may be any suitable device for powering the WTRU 102. For example, power source 134 may include one or more dry cell batteries (e.g. nickel-cadmium (NiCd), nickel-zinc (NiZn), nickel metal hydride (NiMH), lithium-ion (Li-ion)), solar cells, fuel cells and the like.

Processor 118 may be coupled to GPS chipset 136, which may be configured to provide location information (e.g. longitude and latitude) regarding the current location of WTRU 102. In addition to, or in lieu of, information from GPS chipset 136, WTRU 102 may receive location information over air interface 115/116/117 from a base station (e.g. base stations 114a, 114b) and/or determine its location based on the timing of signals being received from two or more nearby base stations. WTRU 102 may acquire location information by way of any suitable location-determination implementation.

Processor 118 may be coupled to other peripherals 138, which may comprise one or more software and/or hardware modules that provide additional features, functionality and/or wired or wireless connectivity. For example, peripherals 138 may comprise an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser and the like.

Figure 1C:
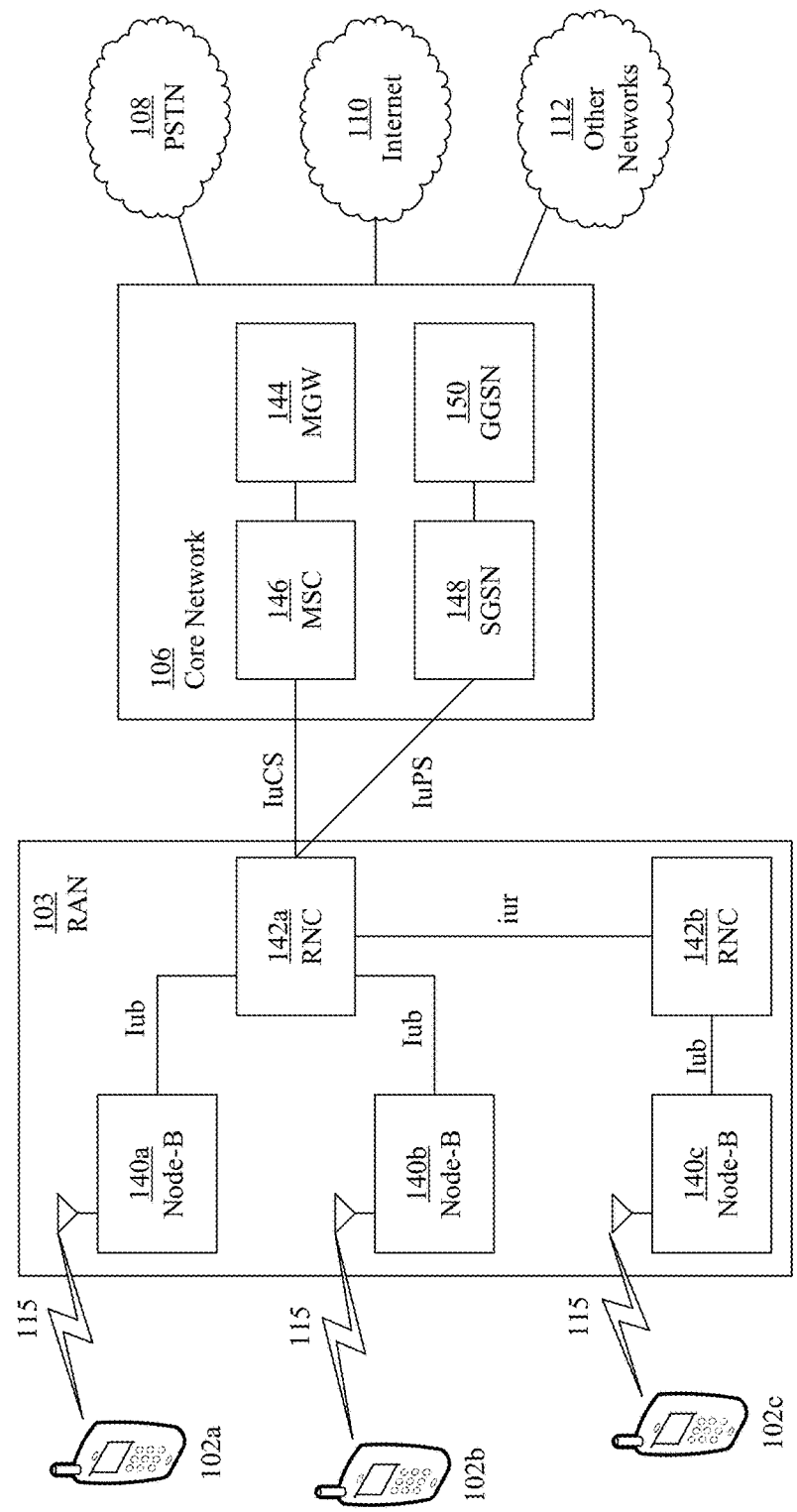
FIG. 1C is a system diagram of an example radio access network and an example core network that may be used in a communication system.

FIG. 1C is a system diagram of examples of RAN 103 and core network 106. RAN 103 may employ a UTRA radio technology to communicate with WTRUs 102a, 102b, 102c over air interface 115. RAN 103 may communicate with core network 106. RAN 103 may comprise Node-Bs 140a, 140b, 140c, which may each have one or more transceivers for communicating with WTRUs 102a, 102b, 102c over air interface 115. Node-Bs 140a, 140b, 140c may each be associated with one or more cells (not shown) within RAN 103. RAN 103 may comprise RNCs 142a, 142b. RAN 103 may comprise any number of Node-Bs and RNCs.

Node-Bs 140a, 140b may be in communication with RNC 142a. Node-B 140c may be in communication with RNC 142b. Node-Bs 140a, 140b, 140c may communicate with respective RNCs 142a, 142b via an Iub interface. RNCs 142a, 142b may be in communication with one another via an Iur interface. RNCs 142a, 142b may each be configured to control respective Node-Bs 140a, 140b, 140c to which they are connected. RNCs 142a, 142b may each be configured to carry out or support other functionality, such as outer loop power control, load control, admission control, packet scheduling, handover control, macrodiversity, security functions, data encryption and the like.

Core network 106 may comprise a media gateway (MGW) 144, a mobile switching center (MSC) 146, a serving GPRS support node (SGSN) 148 and/or a gateway GPRS support node (GGSN) 150. While each of the foregoing elements are depicted as part of the core network 106, any one of these elements may be owned and/or operated by an entity other than the core network operator.

RNC 142a in RAN 103 may be connected to MSC 146 in core network 106, e.g., via an IuCS interface. MSC 146 may be connected to MGW 144. MSC 146 and MGW 144 may provide WTRUs 102a, 102b, 102c with access to circuit-switched networks, such as PSTN 108, to facilitate communications between WTRUs 102a, 102b, 102c and traditional land-line communications devices.

RNC 142a in RAN 103 may be connected to SGSN 148 in core network 106, e.g., via an IuPS interface. SGSN 148 may be connected to GGSN 150. SGSN 148 and GGSN 150 may provide WTRUs 102a, 102b, 102c with access to packet-switched networks, such as Internet 110, to facilitate communications between WTRUs 102a, 102b, 102c and IP-enabled devices.

Core network 106 may also be connected to networks 112, which may include other wired or wireless networks that are owned and/or operated by other service providers.

Figure 1D:
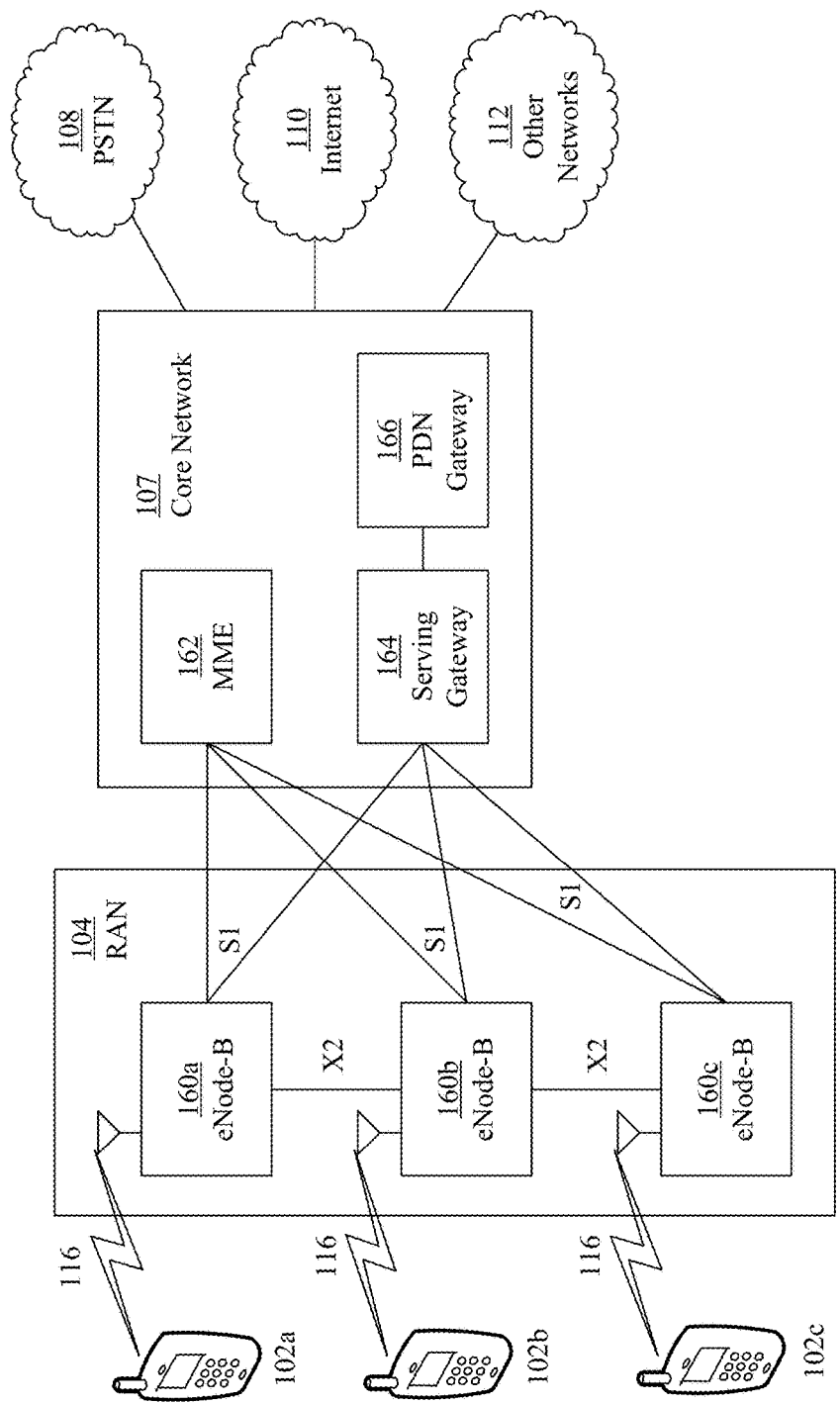
FIG. 1D is a system diagram of another example radio access network and another example core network that may be used in a communications system.

FIG. 1D is a system diagram of examples of RAN 104 and core network 107. RAN 104 may employ an E-UTRA radio technology to communicate with WTRUs 102a, 102b, 102c over air interface 116. RAN 104 may be in communication with core network 107.

RAN 104 may comprise any number of eNode-Bs, e.g., eNode-Bs 160a, 160b, 160c. eNode-Bs 160a, 160b, 160c may each have one or more transceivers for communicating with WTRUs 102a, 102b, 102c over air interface 116. In an example, eNode-Bs 160a, 160b, 160c may implement MIMO technology. For example, eNode-B 160a may use multiple antennas to transmit wireless signals to, and receive wireless signals from, WTRU 102a.

Each of eNode-Bs 160a, 160b, 160c may be associated with a particular cell (not shown) and may be configured to handle radio resource management decisions, handover decisions, scheduling of users in the uplink (UL) and/or downlink (DL) and the like. Each of eNode-Bs 160a, 160b, 160c may communicate with one another over an X2 interface.

Core network 107 may have a mobility management gateway (MME) 162, a serving gateway 164, and a packet data network (PDN) gateway 166. While each of the foregoing elements is depicted as part of the core network 107, any of these elements may be owned and/or operated by an entity other than the core network operator.

MME 162 may be connected to each of eNode-Bs 160a, 160b, 160c in RAN 104 via an S1 interface and may serve as a control node. For example, MME 162 may be responsible for authenticating users of WTRUs 102a, 102b, 102c, bearer activation/deactivation, selecting a particular serving gateway during an initial attach of the WTRUs 102a, 102b, 102c and the like. MME 162 may also provide a control plane function for switching between RAN 104 and other RANs (not shown) that employ other radio technologies, such as GSM or WCDMA.

Serving gateway 164 may be connected to each of eNode-Bs 160a, 160b, 160c in RAN 104, e.g., via an S1 interface. Serving gateway 164 may route and forward user data packets to/from WTRUs 102a, 102b, 102c. Serving gateway 164 may perform other functions, such as anchoring user planes during inter-eNode B handovers, triggering paging when downlink data is available for WTRUs 102a, 102b, 102c, managing and storing contexts of WTRUs 102a, 102b, 102c and the like.

Serving gateway 164 may be connected to PDN gateway 166, which may provide WTRUs 102a, 102b, 102c with access to packet-switched networks, such as Internet 110, to facilitate communications between WTRUs 102a, 102b, 102c and IP-enabled devices.

Core network 107 may facilitate communications with other networks. For example, core network 107 may provide WTRUs 102a, 102b, 102c with access to circuit-switched networks, such as the PSTN 108, to facilitate communications between WTRUs 102a, 102b, 102c and traditional land-line communications devices. For example, core network 107 may include, or may communicate with, an IP gateway (e.g. an IP multimedia subsystem (IMS) server) that serves as an interface between core network 107 and PSTN 108. Core network 107 may provide WTRUs 102a, 102b, 102c with access to networks 112, which may comprise other wired or wireless networks that are owned and/or operated by other service providers.

Figure 1E:
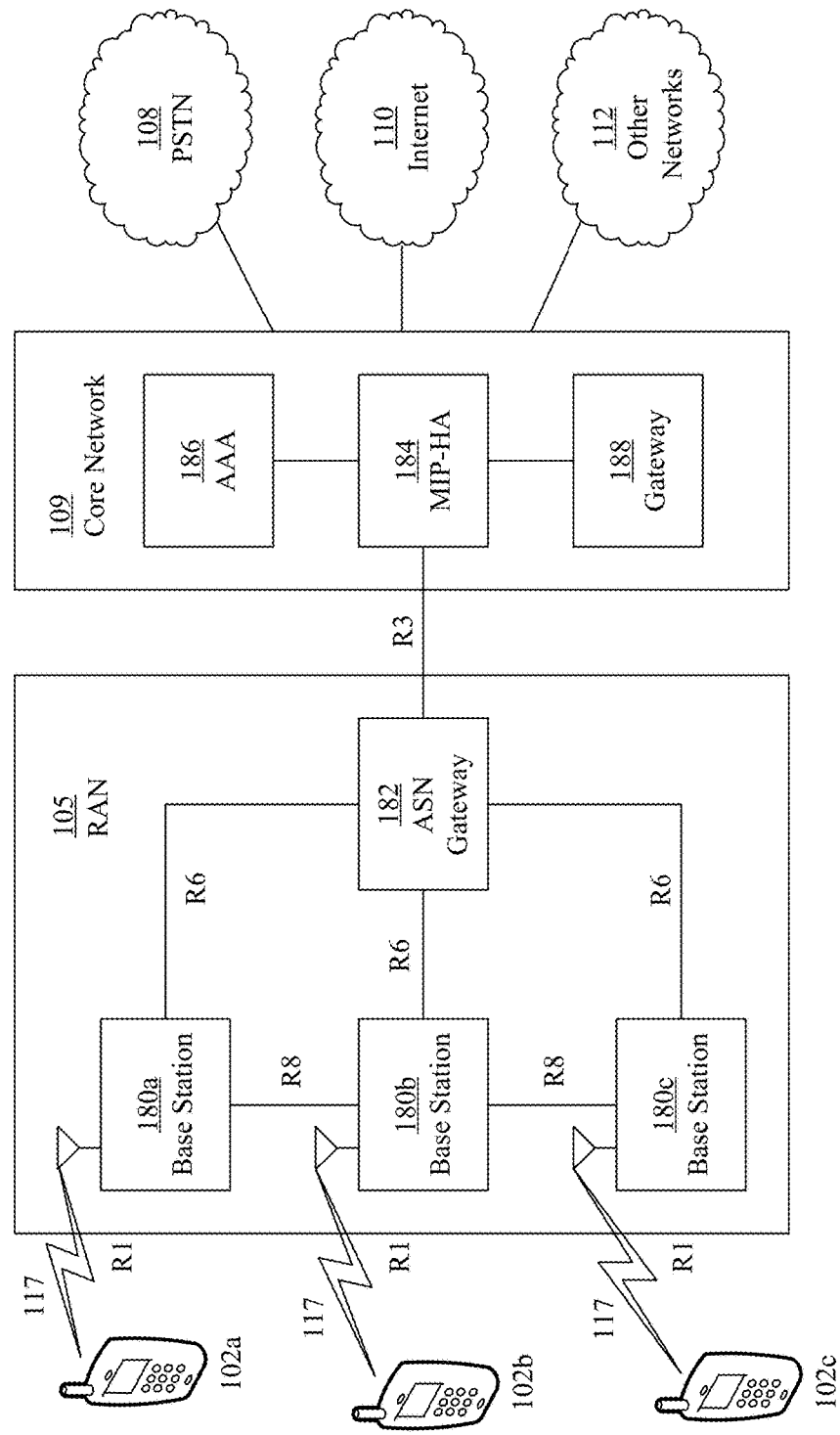
FIG. 1E is a system diagram of another example radio access network and another example core network that may be used in a communication system.

FIG. 1E is a system diagram of examples of RAN 105 and core network 109. RAN 105 may be an access service network (ASN) that employs IEEE 802.16 radio technology to communicate with WTRUs 102a, 102b, 102c over air interface 117. Communication links between the different functional entities of WTRUs 102a, 102b, 102c, the RAN 105 and core network 109 may be defined as reference points.

RAN 105 may comprise any number of base stations and ASN gateways, e.g., base stations 180a, 180b, 180c and an ASN gateway 182. Base stations 180a, 180b, 180c may each be associated with a particular cell (not shown) in RAN 105 and may each have one or more transceivers for communicating with WTRUs 102a, 102b, 102c over air interface 117. Base stations 180a, 180b, 180c may implement MIMO technology. In an example, base station 180a may use multiple antennas to transmit wireless signals to, and receive wireless signals from, WTRU 102a. Base stations 180a, 180b, 180c may provide mobility management functions, such as handoff triggering, tunnel establishment, radio resource management, traffic classification, quality of service (QoS) policy enforcement and the like. ASN gateway 182 may serve as a traffic aggregation point and may be responsible for paging, caching of subscriber profiles, routing to core network 109 and the like.

Air interface 117 between WTRUs 102a, 102b, 102c and RAN 105 may be defined as an R1 reference point that implements the IEEE 802.16 specification. Each of WTRUs 102a, 102b, 102c may establish a logical interface (not shown) with core network 109. Logical interface between WTRUs 102a, 102b, 102c and core network 109 may be defined as an R2 reference point, which may be used for authentication, authorization, IP host configuration management and/or mobility management.

A communication link between base stations 180a, 180b, 180c may be defined as an R8 reference point, which may have protocols for facilitating WTRU handovers and the transfer of data between base stations.

A communication link between base stations 180a, 180b, 180c and the ASN gateway 182 may be defined as an R6 reference point. An R6 reference point may have protocols for facilitating mobility management based on mobility events associated with each of WTRUs 102a, 102b, 102c.

RAN 105 may be connected to core network 109. A communication link between RAN 105 and core network 109 may defined as an R3 reference point, which may have protocols for facilitating data transfer and mobility management capabilities. Core network 109 may comprise a mobile IP home agent (MIP-HA) 184, an authentication, authorization, accounting (AAA) server 186 and a gateway 188. While each of the foregoing elements is depicted as part of the core network 109, any of these elements may be owned and/or operated by an entity other than the core network operator.

The MIP-HA may be responsible for IP address management and may enable WTRUs 102a, 102b, 102c to roam between different ASNs and/or different core networks. MIP-HA 184 may provide WTRUs 102a, 102b, 102c with access to packet-switched networks, such as Internet 110, to facilitate communications between WTRUs 102a, 102b, 102c and IP-enabled devices. AAA server 186 may be responsible for user authentication and for supporting user services. Gateway 188 may facilitate interworking with other networks. For example, gateway 188 may provide WTRUs 102a, 102b, 102c with access to circuit-switched networks, such as PSTN 108, to facilitate communications between WTRUs 102a, 102b, 102c and land-line communications devices. Gateway 188 may provide WTRUs 102a, 102b, 102c with access to networks 112, which may include other wired or wireless networks that are owned and/or operated by other service providers.

Although not shown in FIG. 1E, RAN 105 may be connected to other ASNs and core network 109 may be connected to other core networks. A communication link between RAN 105 and other ASNs may be defined as an R4 reference point, which may have protocols for coordinating the mobility of WTRUs 102a, 102b, 102c between RAN 105 and other ASNs. A communication link between core network 109 and other core networks may be defined as an R5 reference, which may have protocols for facilitating interworking between home core networks and visited core networks.

In view of the constraints of available wireless spectrum combined with ever-increasing wireless communication demand by an increasing number of users, devices and applications, techniques to use available spectrum more efficiently are of critical importance.

A technique to increase spectral efficiency (e.g. simultaneously communicate more information per spectral bandwidth) is signal superpositioning. In signal superpositioning, signals may be superposed (e.g. superposed). For example, the signals may be integrated in concurrent (e.g. simultaneous) communication (e.g. transmission, propagation, and/or reception). Information in signals, signals and/or waveforms may be superposed prior to and/or during transmission. Signals of the same type (e.g. homogeneous signals) may be superimposed and/or different (e.g. heterogeneous) waveforms (e.g. signals) may be superimposed, e.g., on the same frequency channel. For example, heterogeneous signals comprising a multi-carrier (MC) signal and a spread spectrum (SS) signal may be superposed. Orthogonal Frequency Division Multiplexing (OFDM) and Filter Bank Multi Carrier (FBMC) are examples of MC signaling techniques. Code Division Multiplexing (CDM) is an example of SS signaling techniques.

Superposed signals may comprise, for example, multi carrier, frequency division and code division signals, including multiple access, e.g., orthogonal frequency division multiple access (OFDMA) and code division multiple access (CDMA), signals. Data for various receivers may be dynamically selected for signal superpositioning, for example, based on radio access technology, communication rate (e.g. high and low rates), distance between transmitter and receiver (e.g. near and far signals). Communication rate and power may be allocated to superposed signals. Interference nulling may be applied, for example, by selecting or excluding spreading codes and/or subcarriers. Nulled locations may be used to transmit critical information, e.g. reference or pilot information. Interference shaping may be applied to modify interference, e.g., by transmitting interference symbols using reserved spreading codes. Support information, e.g., code indices, code length and/or subcarriers, may be signaled to support or optimize performance.

A superposed waveform may be tailored for a specific application. Superposed signals may be intended for different receivers at different locations. In examples, distant (e.g. long range high transmission power) communications may be superposed with near (e.g. short range low transmission power) communications and/or low rate traffic may be superposed with high rate traffic. For example, short-range, low power, low-rate communication systems may be integrated (e.g. by signal superpositioning) with long-range, high power, high-rate cellular and local area network (LAN) communication systems for more efficient use of bandwidth (BW). Signals may be statically or dynamically grouped for superposition.

The total throughput provided by superposed signals may increase throughput provided by one signal. Various support techniques, such as operational techniques, interference mitigation techniques, etc. may be deployed for various combinations of signaling techniques to improve or optimize performance of superposed signaling techniques. For example, a support technique may support communication of critical information, such as channel estimation pilots. Flexible operation, such as a flexible transmission scheme, may be applied to support partially orthogonal resource allocation with minimal coordination among nodes.

Interposed signaling techniques may have wide ranging applicability, including, but not limited to, multicarrier modulation systems with cyclic prefix (e.g. OFDM) in LTE, WiMAX, 802.11x, 802.15.x, single carrier system with cyclic prefix, 5G wireless communication systems, among other systems. One or more aspects of techniques may be implemented by one or more radio access network (RAN) elements, such as, but not limited to, a UE, terminal, base station, RNC, host computer, etc.

An MC signaling technique, such as OFDM or FBMC, and an SS signaling technique, such as CDMA, may be homogeneously or heterogeneously integrated to superpose signals in shared BW. In an example, OFDMA and CDMA signals may be superposed to provide concurrent mixed traffic communication in shared BW. Similarly, other MC waveforms, such as FBMC, may be superposed with CDMA or other SS waveforms. In an example, a CDM waveform may be used to carry low rate data while an OFDM waveform may be used to carry high rate data. Support techniques, such as transmission power selection techniques, transmission power division techniques and interference mitigation techniques, may be utilized to improve or optimize performance. For example, successive interference cancellation at the receivers and dynamic power/rate allocation at the transmitters may be performed. Support or interference mitigation techniques may include, but are not limited to, interference nulling, interference shaping and/or signaling, among other techniques. While examples are provided for superposing two signals, three or more heterogeneous or homogeneous signals may be superposed.

In an example of interference nulling, certain spreading codes used for a CDMA signal and subcarriers used for an MC signal may be selected or avoided (e.g. reserved or excluded) to achieve full or partial orthogonality between OFDM and CDMA signals. CDMA signal spectrum may be provided with selective "notches," for example, by avoiding certain spreading codes. Those notches may be used, for example, as subcarrier locations for the MC signal to transmit critical information, such as pilots, since there is no interference from the CDMA signal.

In an example of interference shaping, interference created by one signal on another signal (e.g. a CDMA signal on an MC signal, such as an OFDM signal) may be shaped, e.g., to change the distribution and/or intensity of interference (e.g. on a symbol constellation). In an example, some unused CDMA codes may be used to transmit data and create correlated interference. Correlated interference may include interference that may increase the distance between constellation points on OFDM subcarriers.

Interference cancellation information may be signaled to support successive interference cancellation in participating receivers, e.g., CDMA and/or OFDM receivers.

Signals intended for different receivers at different locations may be superposed before or during transmission by one or more collocated or distributed transmitters. Such signals (intended for different receivers at different locations) may, for example, comprise CDMA signals and OFDM signals.

Multicarrier modulation (MCM), such as OFDM, involves splitting a high-rate wideband signal into lower-rate signals, each occupying a narrower band. OFDM is used in wireless communication systems, such as 3GPP Long Term Evolution (LTE), 802.11, etc. OFDM offers many advantages, such as robustness to multipath propagation, simple equalization, a simple transceiver architecture and efficient use of available bandwidth through overlapping subchannels. An orthogonal multiple access scheme, OFDMA, may be implemented by allocating available subcarriers in OFDM to different users.

In CDMA, an SSMA scheme, a signal is spread to occupy a bandwidth much greater than necessary to send information. This results in many benefits, such as reducing the likelihood of signal interference and jamming Signal bandwidth may be spread using a spreading code. Multiple access may be implemented by allocating different spreading codes to different users.

An orthogonal multiple access scheme may allocate non-overlapping fractions of the degrees of freedom to different users. For example, in time division multiple access, each user is assigned a specific amount of time. In OFDMA and CDMA, groups of subcarriers and codes, respectively, may be exclusively assigned to different users to create multiple access.

Superposition coding may efficiently utilize available bandwidth. For example, signals may be superimposed before being transmitted or during transmission by one or more collocated or distributed transmitters. Fully or partially orthogonal transmission may be achieved, for example, by managing available resources, such as subcarriers in OFDM and spreading codes in CDMA.

Figure 2:
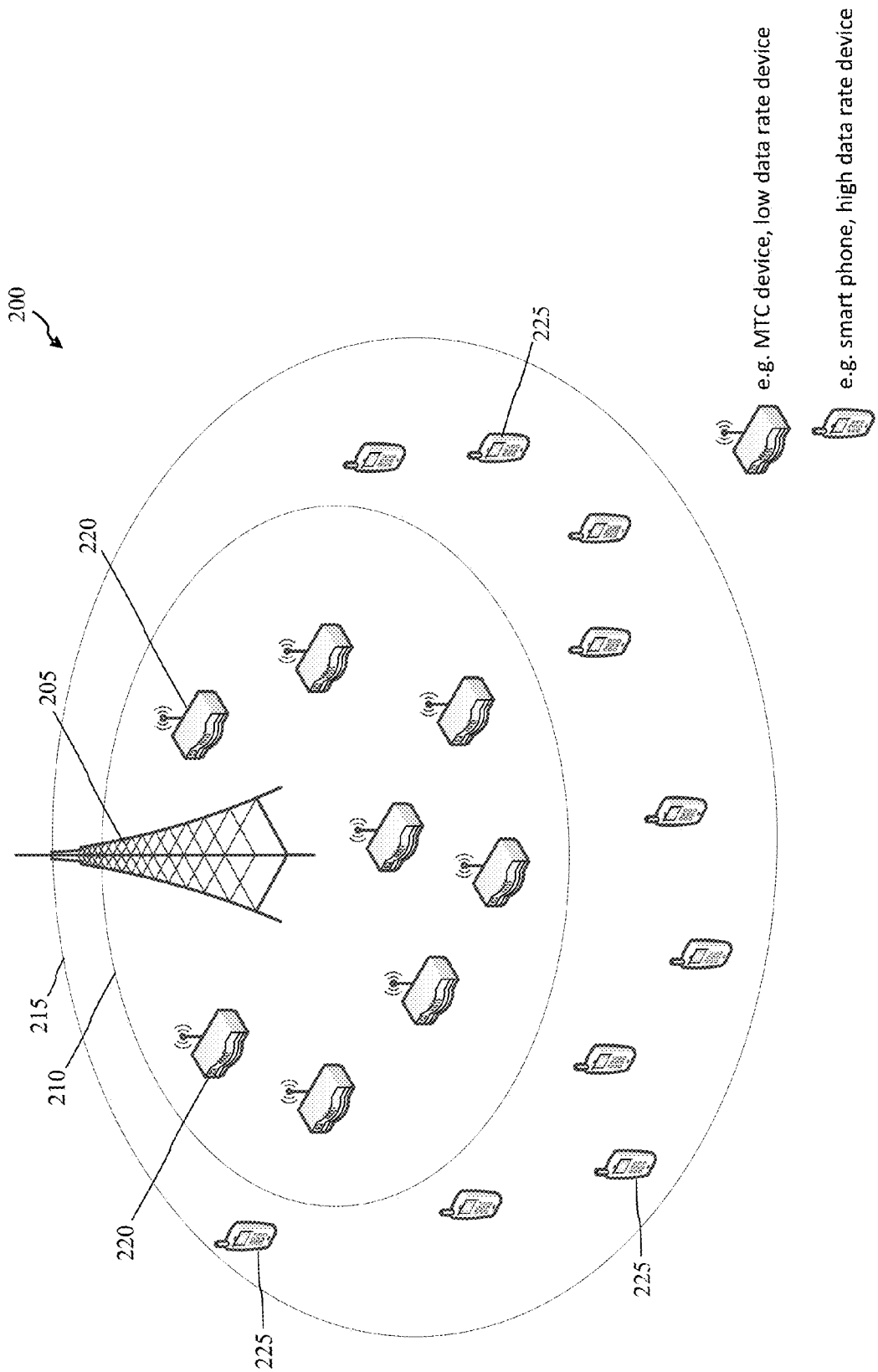
FIG. 2 is a diagram of an example superpositioning scenario to more efficiently utilize bandwidth.

Examples, without limitation, are presented with reference to FIGS. 2-16. FIG. 2 is a diagram of an example superpositioning scenario. In the example shown in FIG. 2, signals to low rate devices, such as certain types of machine-to-machine (M2M) or Machine-Type-Communication (MTC) devices, may be superposed with signals to high rate devices, such as smartphones.

FIG. 2 presents one of many possible example scenarios in which heterogeneous and/or homogeneous superpositioning may be implemented. In the example shown in FIG. 2, system 200 includes base station 205 operating in short range communication area 210 and long range communication area 215. Devices that operate in short range communication area 210 may include short range, low power and/or low data rate devices, such as MTC devices 220. Devices that operate in long range communication area 215 may include long range, high power and/or high data rate devices, such as smartphone devices 225. Smartphone devices 225 and MTC devices 220 may be mixed among short range 210 and long range 215, e.g., boundaries and groupings shown may overlap. Base station 205 may include more than one base station. Base station 205 may communicate with (e.g. transmit to and/or receive from) MTC devices 220 and smartphone device 225, which may be fixed and/or mobile devices.

In an example of heterogeneous superpositioning, a CDMA-based signal may occupy the same BW as an OFDM signal. In an example, the waveforms may have the same sampling rate. The spreading factor for CDMA symbols may be the OFDM BW divided by the CDMA symbol rate, as given in Eq. 1, for example, for the two signals to have the same duration.

$$N_c = \frac{N \times \text{subcarrier spacing}}{CDMA \text{ symbol rate}} = \frac{N\frac{1}{T_s}}{\frac{1}{T_s}} N \qquad \text{Eq. 1}$$

In Eq. 1, N is the number of OFDM subcarriers and $N_C$ is the number of chips in one CDMA symbol duration, e.g., spreading factor. An information rate of the CDMA signal may be determined by the number of codes utilized, which may be proportional to the power of the CDMA signal being superposed with an OFDM signal.

In an example, communications with near users within a short range (e.g. short range 210), low power and/or low rate communication devices (e.g. MTC devices 220) may use a CDMA waveform while communications with far users within a long range (e.g. long range 215), high power and/or high data rate communication devices (e.g. smartphones 225) may use the OFDM waveform. In an example, the waveforms may be reversed, such as where communications with near users with short range and low rate use the OFDM waveform while communications with far users use the CDMA waveform. Other examples may utilize the same or different, heterogeneous or homogeneous modulation techniques.

Received signals for near and far devices may be substantially different, for example, due to different path loss characteristics for near and far devices. Transmission power may be divided, e.g., into two parts, to satisfy received signal quality for both near and far user, for example, considering a difference in received power.

Figure 3:
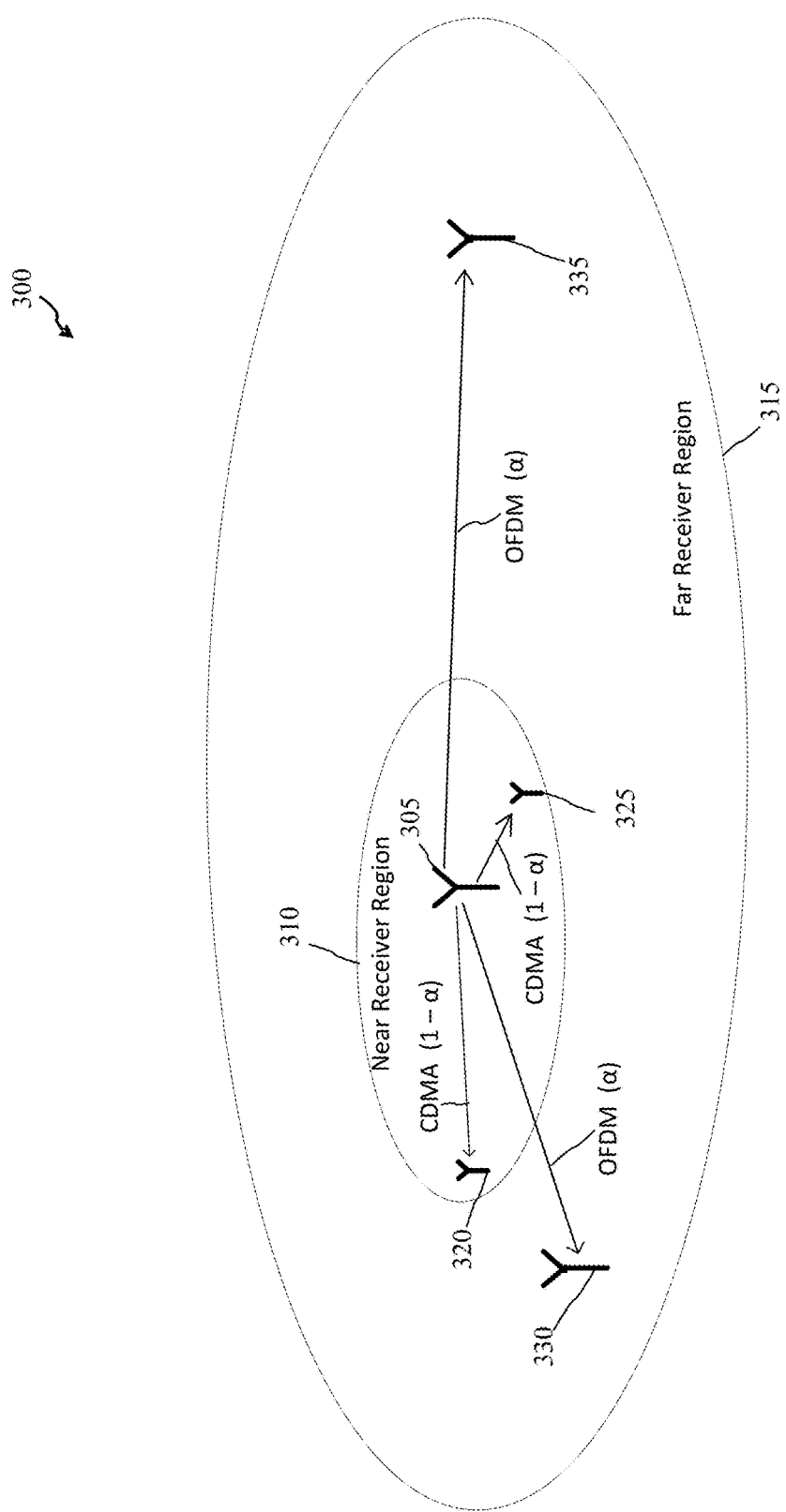
FIG. 3 is a diagram illustrating an example of a heterogeneous OFDM and CDMA superposed signaling arrangement.

FIG. 3 is a diagram illustrating an example of a superposed heterogeneous OFDM and CDMA signaling arrangement. Superposition scenario 300 comprises base station transmitter 305 operating in near receiver region 310 and far receiver region 315. Near receiver region 310 comprises first near receiver 320 and second near receiver 325. Far receiver region 315 comprises first far receiver 330 and second far receiver 335.

An example signaling arrangement, which may be utilized in example superposition scenario 300, may be based on proximity (e.g. near and far distance) and/or data rate (e.g. low and high data rate) of recipients and/or devices. Recipients, data and/or signals intended for recipients may be dynamically selected for superpositioning based on proximity, position, data rate, communication type, modulation type and/or other criteria. Proximity may be based on receiver location (e.g. first or second near receivers 320, 325 or first or second far receivers 330, 335) relative to a transmission source such as a base station (e.g. base station 305).

In an example, data or other communication intended for first near receiver 320 may be dynamically paired with data or other communication intended for first far receiver 330. The signals carrying the data or other communication may be superposed before or during transmission by one or more collocated or distributed transmitters (e.g. base station 305). Data or other communication intended for second near receiver 325 may be dynamically paired with data or other communication intended for second far receiver 335. The signals carrying the data or other communication may be superposed before or during transmission by one or more collocated or distributed transmitters (e.g. base station 305).

Transmission of superposed OFDM and CDMA signals may be performed with power control. A transmitter may, for example, allocate power for an OFDM signal (e.g. $\alpha P$) and power for a CDMA signal (e.g. $(1-\alpha)P$), where P is total transmission power, according to path losses and received signal to interference plus noise ratios (SINRs) for first and second receivers that would receive the OFDM and CDMA signals, respectively. Selection of $\alpha$ may be a function of a rate of the CDMA signal compared to the OFDM signal (or vice versa), for example, considering the effect of the CDMA signal on SINR for OFDM reception (or vice versa).

A transmitted block containing superimposed OFDM and CDMA signals may be expressed in the time domain in accordance with Eq. 2.

$$y = \sqrt{P\alpha}F^H x_1 + \sqrt{P(1-\alpha)}C_d x_2 \qquad \text{Eq. 2}$$

In Eq. 2, P may indicate the total transmission power, a may indicate the ratio of far user (e.g. OFDM) signal power to total transmission power P, F may be an N×N DFT matrix and $C_d$ may be an N×M data code matrix, where M is the number of codes utilized for CDMA data. An M/N ratio may denote a rate ratio of the CDMA signal to the OFDM signal. $x_1$ is an N×1 vector containing complex data symbols for a far user (e.g. OFDM). $x_2$ is an M×1 vector containing complex data symbols for a near user (e.g. CDMA). In other examples, superposed heterogeneous and homogeneous signals may be expressed differently than Eq. 2.

Figure 4:
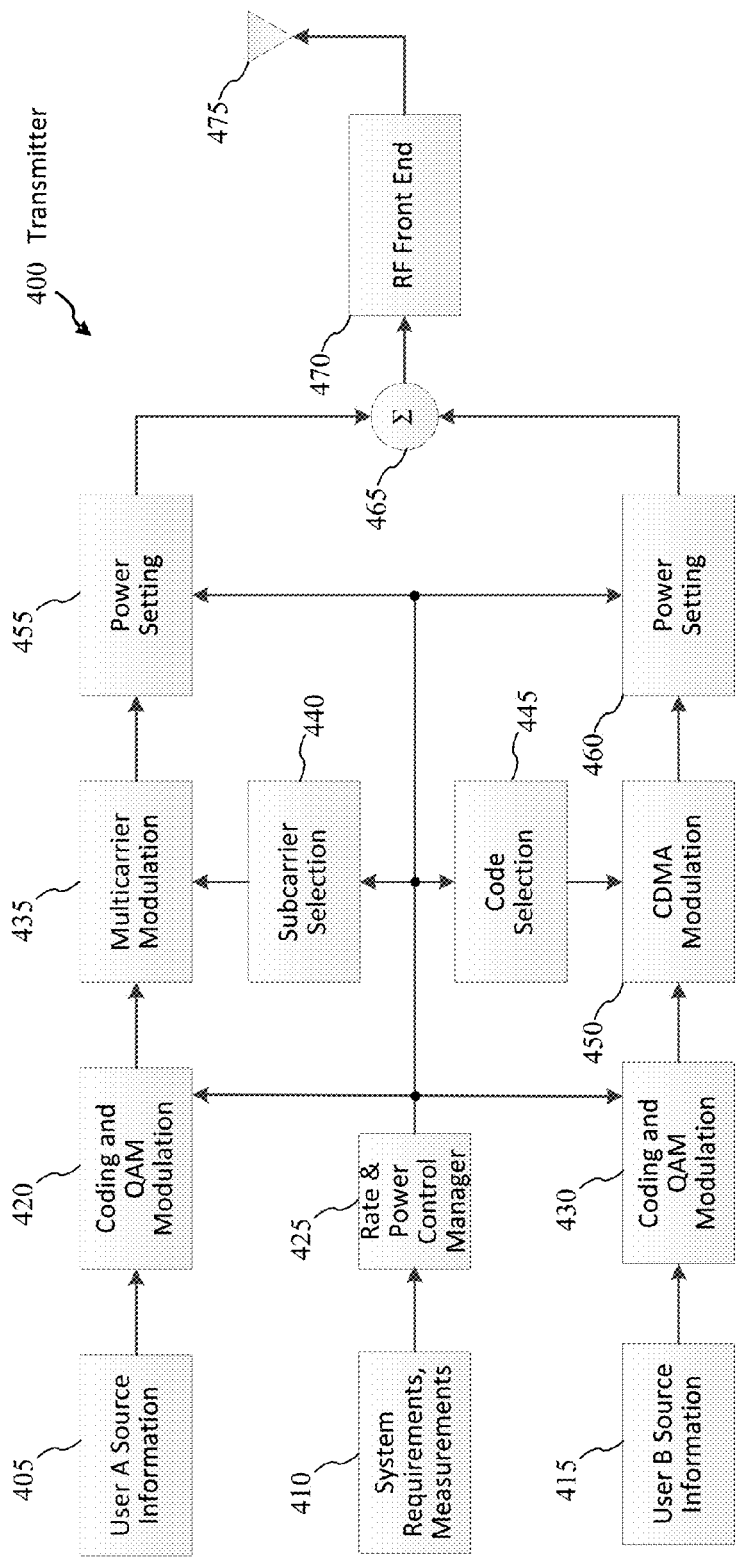
FIG. 4 is a diagram of an example of a heterogeneous superpositioning transmitter that transmits superposed OFDM and CDMA signals.

FIG. 4 is a diagram of an example of a heterogeneous superpositioning transmitter that may transmit superposed OFDM and CDMA signals. Transmitter 400 may be provided with, for example, user source information 405, system requirements and/or measurements 410 and user B source information 415. User A source information 405 may be data and/or another communication intended for a first receiver. User B source information 415 may be data and/or another communication intended for a second receiver. System requirements and/or measurements 410 may provide information pertaining to superpositioning, such as receiver proximity, position, data rate, communication type, modulation type and/or other parameters relevant to superpositioning criteria and techniques. In an example, user A may be designated a near user and user B may be designated a far user, e.g., based on system proximity measurements 410.

Transmitter 400 may be implemented in one or more components in WTRU 102 including, but not limited to, transceiver 120, processor 118, transmit/receive element 122, non-removable memory 130 and removable memory 132 as described herein with respect to FIG. 1B. Transmitter 400 may be implemented in a Node-B, an eNode-B, a base station and/or other network entity/entities as described herein with respect to FIGS. 1C, 1D and 1E.

User A source information 420 may be coded and modulated 420, e.g., to generate symbols for user A source information. User B source information 415 may be coded and modulated 430, e.g., to generate symbols for user B source information. Any type of coding and any type of modulation may be used in support of superpositioning. In an example, modulation may comprise QPSK (4QAM) or 16QAM. System requirements and/or measurements 425 may be provided to rate and power control manager 425. User A coding and modulation 420 and user B coding and modulation 430 may be controlled by rate and power control manager 425, for example, to adapt or coordinate coding and modulation in support of superpositioning. In an example, symbol rates generated by user A and user B coding and modulation 420, 430 may be controlled by rate and power control manager 425.

Multicarrier modulation 435 may provide carrier modulation to user A source information symbols generated by user A coding and modulation 420. CDMA modulation 450 may provide CDMA modulation to user A source information symbols generated by user B coding and modulation 420. In other examples, other modulation schemes may be utilized to modulate user A source information symbols and user B source information symbols. Although modulation schemes 435, 450 are heterogeneous, in other examples they may be heterogeneous or homogeneous.

Multicarrier modulation 435 may include, for example, an OFDM modulator to modulate user A (e.g. far user) source information symbols, thereby generating an OFDM signal. OFDM modulation may include, for example, N-size IFFT block and Cyclic Prefix (CP) insertion.

CDMA modulation 450 may comprise a CDMA modulator to modulate user B (e.g. near user) source information symbols, thereby generating a CDMA signal. CDMA modulation may comprise, for example, spreading with Hadamard code sequences. A rate of the CDMA signal may be denoted by M≤N, representing a number of codes used for CDMA data transmission. In an example, the same CP insertion process used in multicarrier modulation 435 to generate the OFDM signal may be used in CDMA modulation 450 to generate the CDMA signal.

Subcarrier selection 440 selects subcarriers for multicarrier modulation 435. Code selection 445 selects spreading codes for CDMA modulation 450. CDMA code selection 445 may determine indexes for M spreading codes being utilized by CDMA modulation 450. Transmitter 400, e.g., rate and power control manager 425, may provide information used to control subcarrier selection 440 and code selection 445 in support of superpositioning.

MCM power setting 455 may control a power level of the MCM (e.g. OFDM) signal generated by multicarrier modulation 435. CDMA power setting 460 may control a power level of the CDMA signal generated by CDMA modulation 450.

Transmitter 400, e.g., rate and power control manager 425, may assign a power allocation ratio between OFDM and CDMA signals, e.g., as a function of M/N. A power ratio may be allocated in consideration of path loss differences for a CDMA receiver receiving the CDMA signal and an OFDM receiver receiving the OFDM signal and/or in consideration of system requirements (e.g. SINRs specified for near and far users).

A power setting ($\alpha$) may be determined for the OFDM signal. A power setting ($1-\alpha$) may be determined for the CDMA signal. Output of OFDM and CDMA modulators may be weighted based on OFDM and CDMA power settings, respectively, $\alpha$ and $1-\alpha$ values in this example.

In an example, OFDM and CDMA signals at the selected power settings may be superposed in the digital domain before being sent to an RF stage, e.g., RF front end 470, for transmission. As shown in the example in FIG. 4, summation 465 may sum or superimpose OFDM and CDMA signals at selected power settings. As described herein, in an example, superimposed OFDM and CDMA signals may be expressed in the time domain in accordance with Eq. 2. RF front end 470 receives and transmits, e.g., wirelessly via antenna 475, the superimposed OFDM and CDMA signals.

Figure 5:
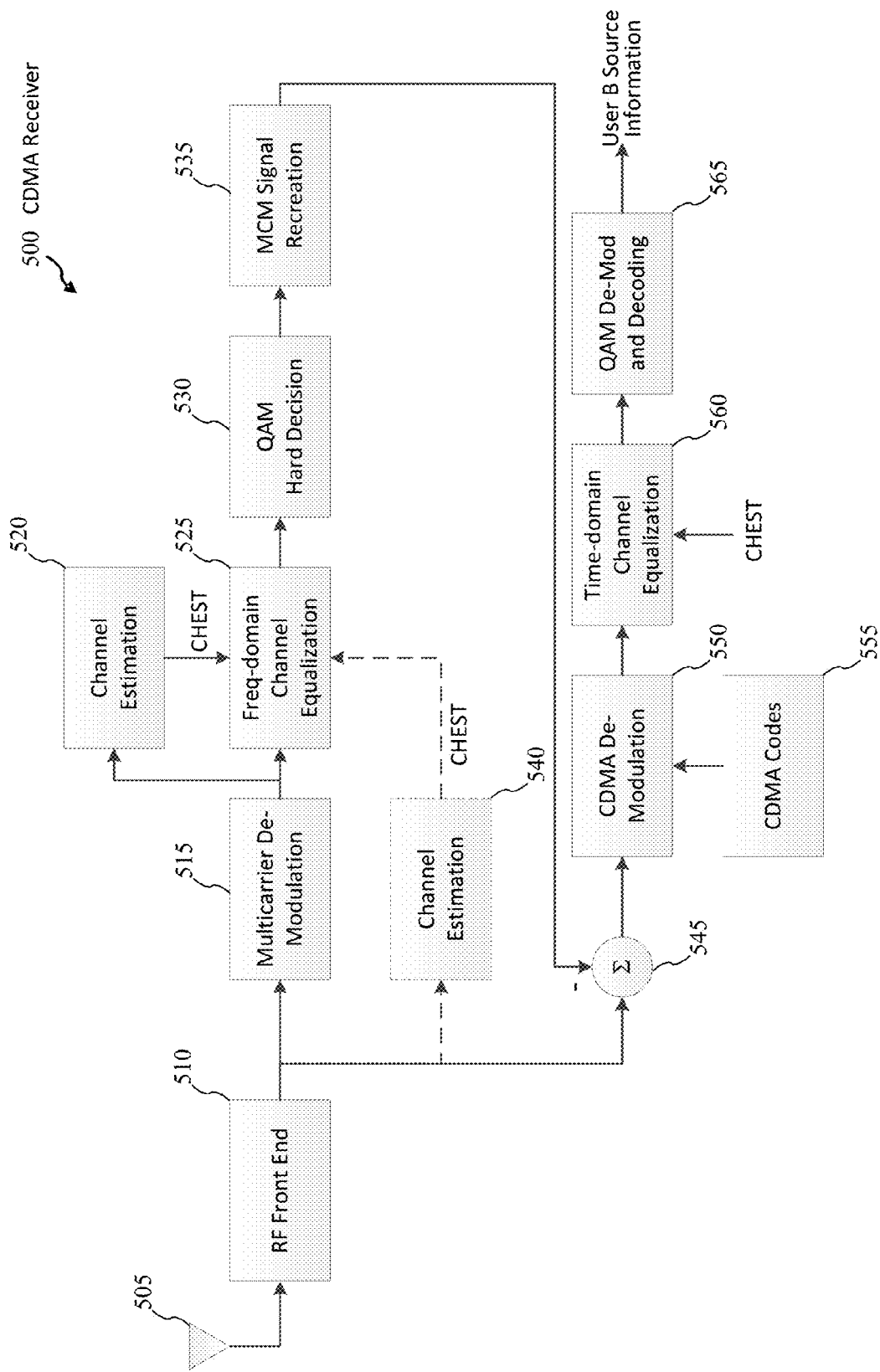
FIG. 5 is a diagram of an example of a CDMA receiver of superposed signaling with OFDM signal cancellation.

FIG. 5 is a diagram of an example of a CDMA receiver of superposed signaling with OFDM signal cancellation. CDMA receiver 500 may receive a transmitted signal, e.g., wirelessly via antenna 505. RF front end 510 may receive from antenna 505 a superposed signal, e.g., superposed OFDM and CDMA signals transmitted by transmitter 400.

A superposed OFDM signal may be intended for a far user (e.g. user A in a far receiver region) while a superposed CDMA signal may be intended for a near user (e.g. user B in a near receiver region). A far user may experience higher path loss compared to the near user (user B in a near receiver region). Power allocation to each superposed signal may result in transmit power for the OFDM signal being much higher than transmit power for the CDMA signal, e.g., $\alpha \gg (1-\alpha)$. A power differential between superposed signals may permit a near user receiver (e.g. CDMA receiver 500) to treat the near (e.g. CDMA) signal as controlled interference to the OFDM signal. In the frequency domain, a CDMA signal may interfere with OFDM subcarriers. CDMA interference may be controlled by determining transmission power a at the transmitter.

A near user receiver (e.g. CDMA receiver 500) may perform reception successively, for example, to subtract (cancel) a superposed far user signal (e.g. OFDM signal) from a received superposed signal to identify a near user signal (e.g. CDMA signal). In this example, receiver architecture (e.g. 515 to 540) may determine the OFDM signal, e.g., to subtract it from the received superimposed signal, and receiver architecture (e.g. 550 to 565) may determine user B source information from the received CDMA signal. Summation 545 cancels the OFDM signal to isolate the CDMA signal.

Multicarrier demodulation 515 may demodulate the received OFDM signal provided by receiver RF front end 510. Channel estimation 520 may generate a channel estimate (CHEST) in the frequency domain from the demodulated OFDM signal, for example, based on channel estimation pilot information or other OFDM reference information transmitted in or the OFDM signal. Channel estimation 540 may determine a channel estimate (CHEST), for example, based on a CDMA reference signal in the time domain. Frequency domain channel equalization 525 may perform channel equalization (e.g. removes OFDM waveform distortion), for example, based on CHEST. QAM hard decision 530 determines QAM modulated user A source information (e.g. symbols) based on the equalized OFDM signal. MCM signal recreation 535 recovers the OFDM signal. Channel estimation 520 and 540 may be used together. Estimated channel information obtained from channel estimation 520 and 540 may be used separately or combined. In an example, a channel estimation may be determined from a weighted average of estimated channel information from channel estimation 520 and 540.

Summation 545 may subtract (e.g. cancel) the recovered OFDM signal from the received superposed signal. The remaining portion of the superposed signal may include the CDMA signal intended for the near user and background noise. In successive fashion, the near user receiver (e.g. CDMA receiver 500) may demodulate the remaining CDMA signal to regenerate the user B source information. CDMA demodulation 550 may demodulate the CDMA signal based on CDMA codes 555, where an indication of CDMA codes 555 may be signaled to CDMA receiver 500. Time domain channel equalization 560 may perform channel equalization in the time domain based on CHEST. QAM demodulation and decoding recovers user B source information.

Figure 6A:
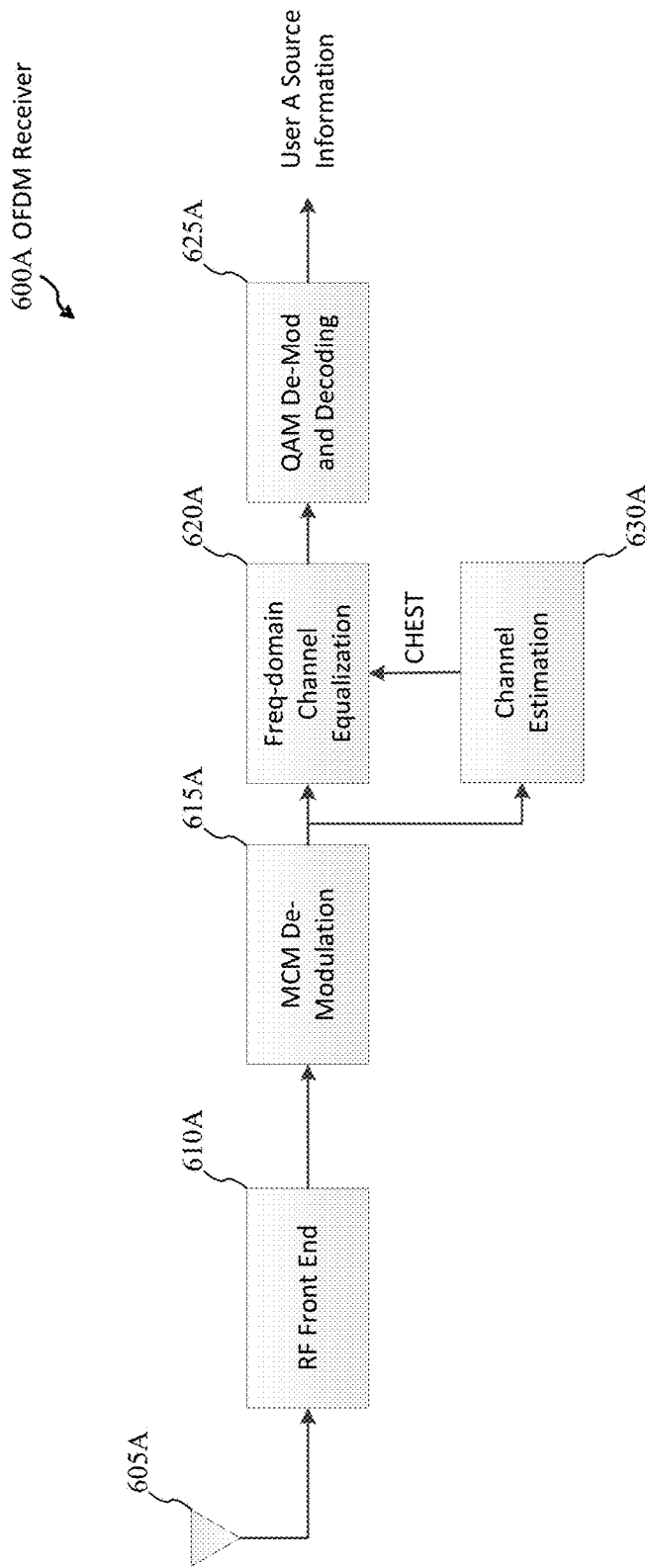
FIG. 6A is a diagram of an example OFDM receiver where a superposed CDMA signal is treated as noise.

FIG. 6A is a diagram of an example OFDM receiver where a superposed CDMA signal is treated as noise, as in a case where OFDM signaling is provided to a distant receiver and CDMA signaling fades to noise. OFDM receiver 600A may receive a transmitted signal, e.g., wirelessly via antenna 605A. RF front end 610A may receive from antenna 605A a superposed signal, e.g., superposed OFDM and CDMA signals transmitted by transmitter 400.

A far OFDM receiver (e.g. OFDM receiver 600A) may demodulate a far signal (e.g. an OFDM signal) in the received superposed signal by treating a near superposed signal (e.g. CDMA signal) as interference. A far receiver may receive a superposed signal after experiencing a higher path loss than a near receiver. Different power allocations for transmission of near and far signals, e.g., $\alpha \gg 1-\alpha$, may be used to satisfy system requirements (e.g. SNR criteria) at near and far receivers. A lower transmission power for a near signal may result in transmission power of the near signal fading to a power level of noise at a far receiver. This may permit a far receiver (e.g. OFDM receiver 600A) to demodulate the OFDM signal, e.g., as indicated in the example shown in FIG. 6A. In an example, the far receiver may directly demodulate the OFDM signal.

MCM demodulation 615A may perform multicarrier demodulation of the OFDM signal provided by RF front end 610A. Channel estimation 630A may generate a channel estimate (CHEST) in the frequency domain from the demodulated OFDM signal, for example, based on channel estimation pilot information or other OFDM reference information transmitted in the OFDM signal. Frequency domain channel equalization 620A may perform channel equalization (e.g. removes OFDM waveform distortion), for example, based on CHEST. QAM demodulation and decoding 625A performs demodulation and decoding to recover user A source information from the equalized OFDM signal.

Figure 6B:
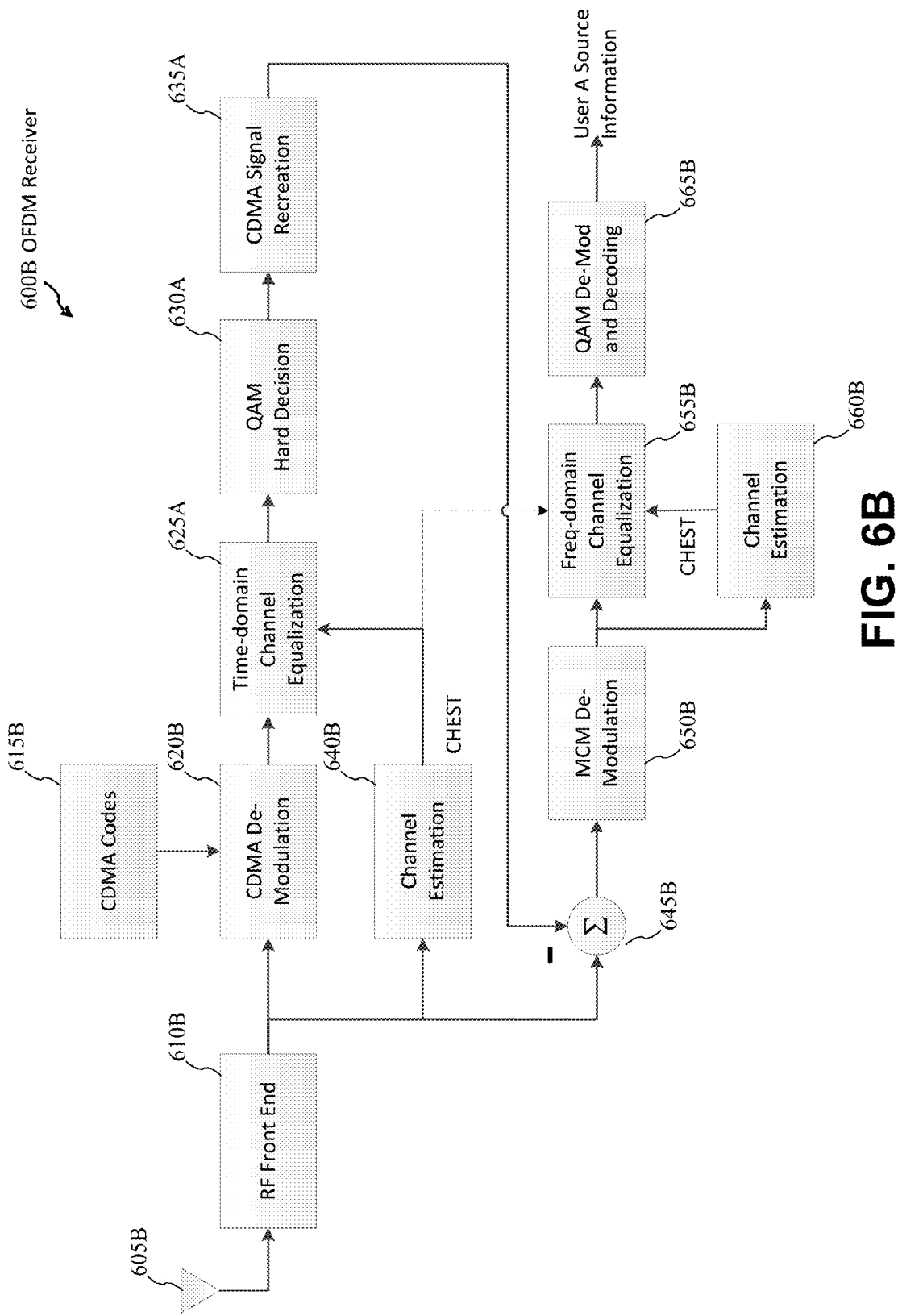
FIG. 6B is a diagram of an example OFDM receiver with CDMA signal cancellation where a superposed CDMA signal is discernible.

FIG. 6B is a diagram of an example OFDM receiver with CDMA signal cancellation. A superposed CDMA signal may be discernable at an OFDM receiver, for example, in a case where a CDMA signal did not fade to noise levels or where an OFDM receiver is a near receiver. CDMA signal cancellation may help isolate the OFDM signal. Similar to OFDM cancellation in CDMA receiver 500, CDMA signaling may be canceled, e.g., by successive processing, to isolate and demodulate the OFDM signal.

In this example, receiver architecture (e.g. 615B to 640B) determines the CDMA signal, e.g., to subtract it from the received superimposed signal, and receiver architecture (e.g. 650B to 665B) determines user A source information from the received OFDM signal. Summation 645B cancels the CDMA signal to isolate the OFDM signal.

CDMA demodulation 620B demodulates the received CDMA signal provided by OFDM receiver RF front end 610B based on CDMA codes 615B. Time domain channel equalization 625A performs channel equalization (e.g. removes CDMA waveform distortion), for example, based on CHEST. Channel estimation 640B may determine a channel estimate (CHEST), for example, based on a CDMA reference signal in the time domain. QAM hard decision 630A determines QAM modulated user B source information (e.g. symbols) based on the equalized CDMA signal. CDMA signal recreation 635A recovers the CDMA signal.

Summation 645B subtracts (cancels) the recovered CDMA signal from the received superposed signal. The remaining portion of the superposed signal is the OFDM signal and background noise. In successive fashion, OFDM receiver 600B may demodulate the remaining OFDM signal to regenerate the user A source information. MCM demodulation 650B performs multicarrier demodulation of the OFDM signal provided by summation 645B. Channel estimation 660B may generate a channel estimate (CHEST) in the frequency domain from the demodulated OFDM signal, for example, based on channel estimation pilot information or other OFDM reference information transmitted in the OFDM signal. Frequency domain channel equalization 655B performs channel equalization (e.g. removes OFDM waveform distortion), for example, based on CHEST determined by channel estimation 640B or 660B. QAM demodulation and decoding 665B performs demodulation and decoding to recover user A source information from the equalized OFDM signal.

FIG. 7A illustrates a benefit provided by superposed signaling relative to bandwidth usage and preservation. Frequency-power graph 700A illustrates bandwidth conservation by superpositioning. In this example, a first signal 705 (e.g. full rate OFDM) and a second signal 710 (e.g. low rate (fractional rate) CDMA) are transmitted orthogonally in frequency bandwidth N and frequency bandwidth M, respectively. Bandwidth M may be conserved, for example, by superposing second signal 710 on frequency bandwidth N, e.g., as shown by superposed second signal 715 and conserved bandwidth M 720. Sharing bandwidth N to conserve bandwidth M increases spectral efficiency by increasing the use of band N and permitting band M to be reallocated, e.g., for additional superpositioning (bandwidth sharing), a low-rate low-range system or any other use. In other examples, more than two signals may be superposed, conserving part or all of one or more frequency bands.

FIG. 7B illustrates an example of total transmission power for superposed signaling relative to a difference in path loss for near and far signals. Nonorthognal superpositioning compared to orthogonal frequency division, e.g., as shown in FIG. 7A, may involve an increase in total transmission power. Path loss power graph 700B shows an example of the total transmission power for two orthogonal (non-superposed) or two superposed signals in FIG. 7A as a function of a difference in path loss for near and far signals. In an example, each of the four curves shown in FIG. 7B presents the total or sum of CDMA signal power and OFDM signal power that achieves a constant signal to interference plus noise power ratio (SINR) for CDMA and OFDM signals.

Plot 745 indicates the total (combined) power of orthogonal first and second signals 705, 710 shown in FIG. 7A when M is ¼ N. Plot 735 indicates the total (combined) power of first and second superposed (nonorthogonal) signals 705, 715 when M is ¼ N. Power differential 745 indicates the total transmission power difference between orthogonal first and second signals 705, 710 and superposed first and second signals 705, 715 when M is ¼ N.

Plot 730 indicates the total (combined) power of orthogonal first and second signals 705, 710 shown in FIG. 7A when M is ½N. Plot 740 indicates the total (combined) power of first and second superposed (nonorthogonal) signals 705, 715 when M is ½N. Power differential 750 indicates the total transmission power difference between orthogonal first and second signals 705, 710 and superposed first and second signals 705, 715 when M is ½N.

It may be observed that the total transmission power used for superpositioning (BW preservation/efficiency) decreases as the power difference between near and far systems increases. This demonstration of a relatively low cost for BW efficiency may encourage superpositioning of signals for near and far users.

Figure 8:
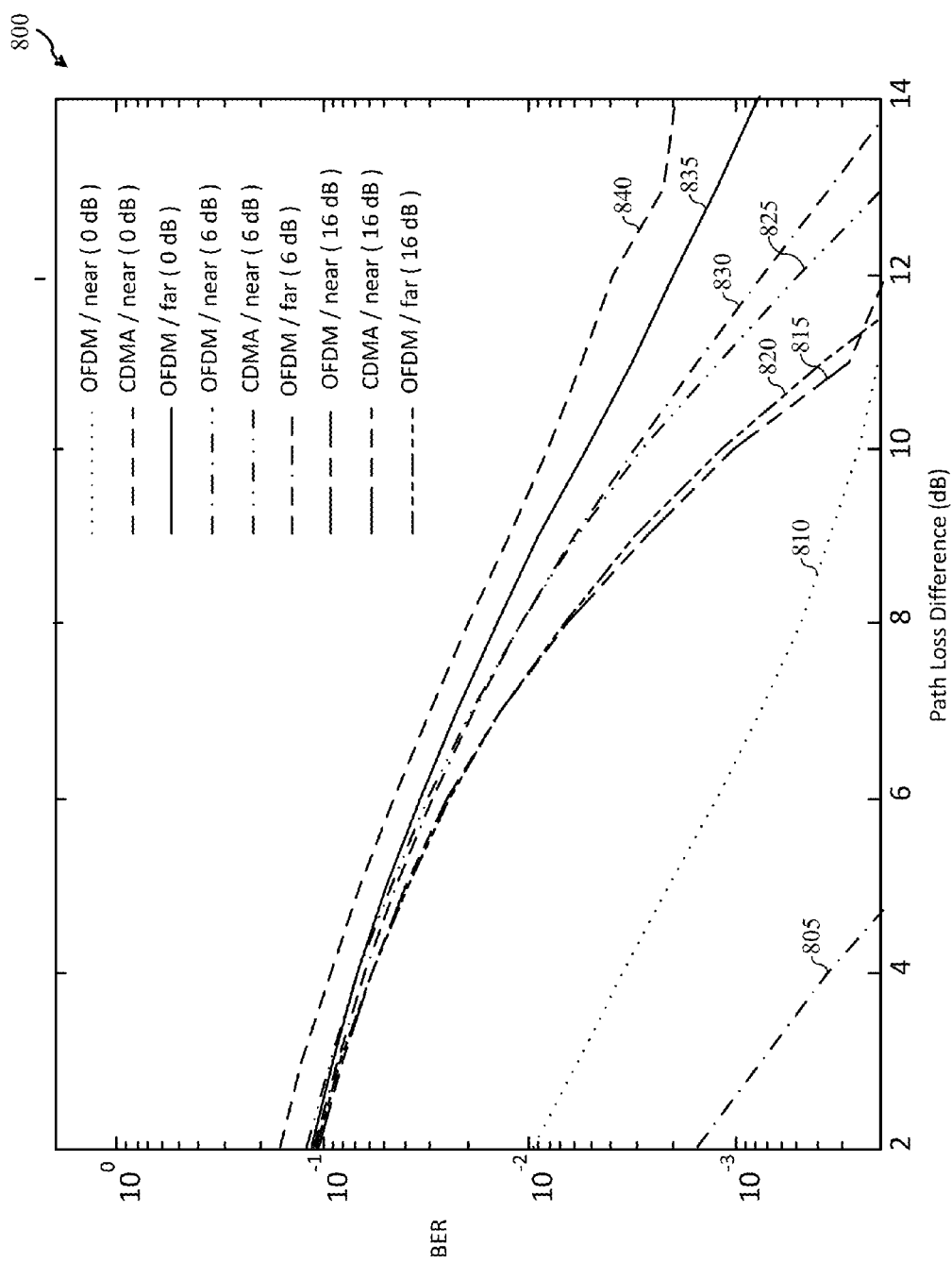
FIG. 8 illustrates an example of bit error rate simulation results for near and far signals.

FIG. 8 illustrates an example of bit error rate (BER) simulation results for near and far user signals. This example of BER simulation results assumes N=64, M=16, $\alpha$=0.87 where power allocation is configured to achieve 10 dB SINR for both receivers. BER path loss graph 800 presents an example where each of the curves shown in FIG. 8 represents BER vs path loss differences between near and far receiver locations for a given target SINR that is set the same for both desired received signals at near and far receiver. In an example, the desired received signal for a near user is the CDMA signal and the desired received signal for a far user is the OFDM signal. Three examples of target SNR values (0, 6 and 16 dB) are shown in the legend of FIG. 8. Results for OFDM/near are shown, for example, given that a near receiver may demodulate the OFDM signal first and cancel it out from the total received signal before demodulating the CDMA signal. The curve for OFDM/near (16 dB) is not shown in FIG. 8 because the BER is so low. It may be observed that the higher the path loss difference (i.e. the higher the power difference), the better the performance for both near and far users.

Performance of some superpositioning implementations may be managed, improved or optimized by support techniques, such as, but not limited to, interference nulling (e.g. excluding or selecting spreading codes and/or subcarriers to achieve full or partial orthogonality), interference shaping (e.g. reserving codes and using reserved codes to transmit data that redistributes interference) and interference signaling (e.g. support signaling to improve demodulation and decoding of superposed signals).

Interference nulling may help manage interference between superposed signals. Superimposing two waveforms on the same frequency band may lead to interference between superposed waveforms. In an example where CDMA and OFDM signals are superposed, CDMA interference on the OFDM signal may be managed, for example, by selecting, or not selecting (avoiding or excluding), a particular set of Hadamard codes. Spectral response of the overall CDMA signal may be nulled for some OFDM subcarriers. Selective nulling of the CDMA signal spectrum (e.g. by excluding codes) may be used, for example, to adjust the orthogonality level between two waveforms. A perfect time/frequency synchronization with an OFDM signal may correspond to a perfect null in a CDMA signal at the frequency locations of interest for OFDM reception. Interference from an OFDM signal may be introduced to a CDMA signal by transmitting data to some subcarriers. This configuration may be referred to as "partially orthogonal waveforms." Signals may be superimposed before or during transmission by one or more collocated or distributed transmitters.

In an example where the first Q codes from Walsh-Hadamard codes are excluded from CDMA data modulation, $Q' \leq Q < 2^L$ uniformly spaced notches may be created, where Q' is the largest power-of-two integer smaller than Q. For example, if Q is 10, Q' is 8, e.g., 2*2*2, and if Q is 8, Q' is 4, e.g., 2*2, which is the largest power-of-two integer smaller than Q. As a result, the number of subcarriers between two adjacent notches is N/Q'. Periodic nulls (i.e. notches) may provide zero interference (i.e. perfect nulls) on some subcarriers, such as equidistant subcarriers, of the OFDM signal.

Figure 9:
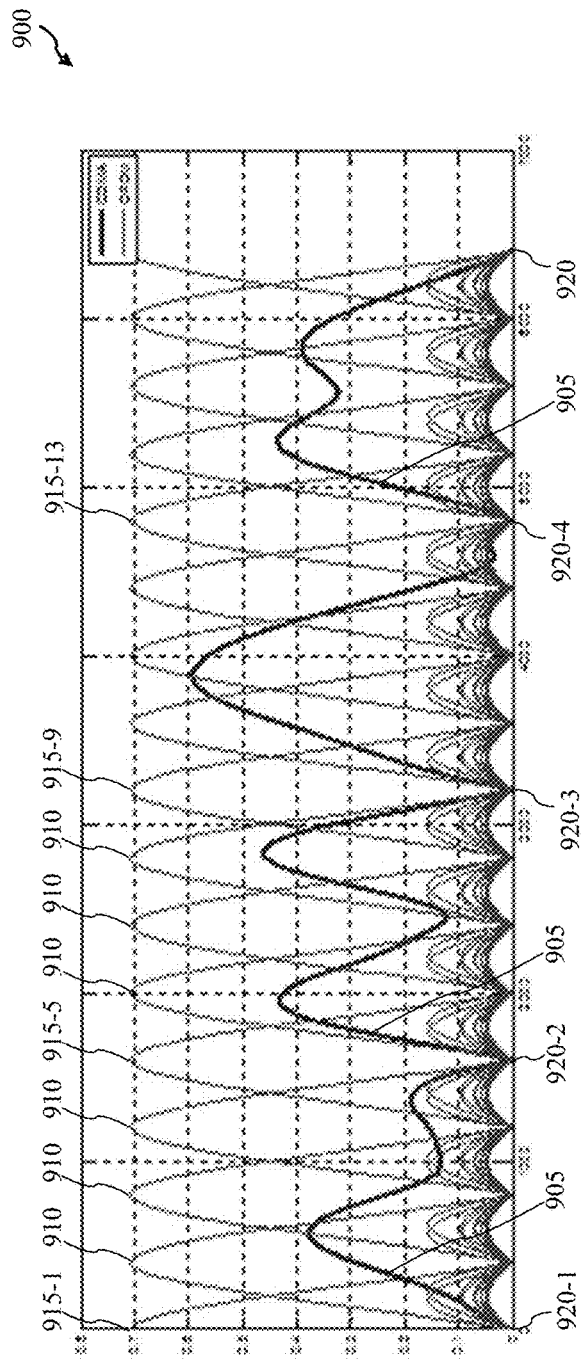
FIG. 9 illustrates an example of power spectral density (PSD) for an example of superimposed CDMA and OFDM signals with notches in the CDMA signal providing no interference for some OFDM signal subcarriers.

FIG. 9 illustrates an example of power spectral density (PSD) for an example of superimposed CDMA and OFDM signals with notches in the CDMA signal providing no interference for some OFDM signal subcarriers. PSD graph 900 shows CDMA signal 905 and OFDM signal 910. In this example, the number of subcarriers for an OFDM signal is 16 and the number of Walsh-Hadamard codes excluded from the CDMA signal is four. In an example, exclusion of the first four codes create notches 920-1, 920-2, 920-3 and 920-4 in CDMA signal 905. These notches result in no interference by the CDMA signal at some OFDM subcarriers. In view of the excluded codes, as shown in FIG. 9, at OFDM subcarrier 1, 5, 9, and 13, indicated as 915-1, 915-5, 915-9 and 915-13, there is no interference from the CDMA signal. Various implementations may have a wide variety of coordinated code exclusions and/or subcarrier selections to obtain periodic or aperiodic notches that provide full or partial orthogonality between heterogeneous or homogeneous superposed signals.

Figure 10:
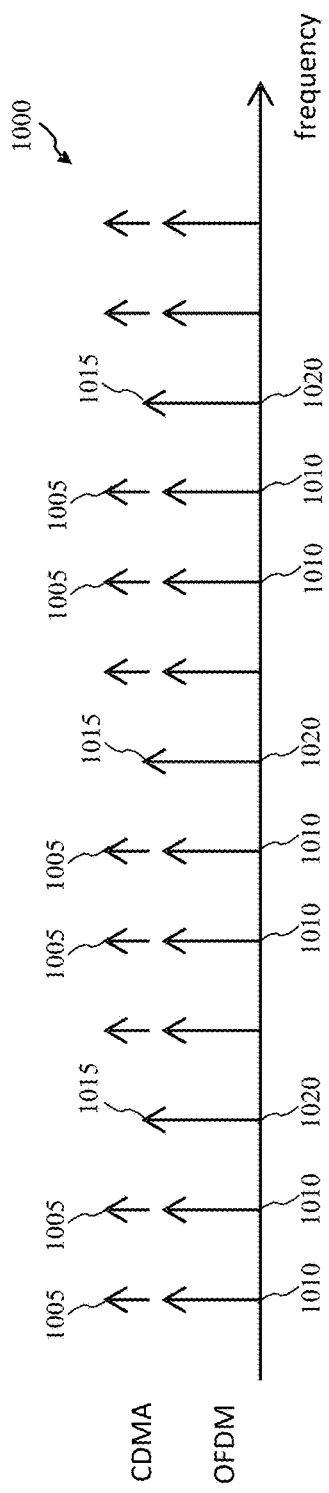
FIG. 10 shows a potential use for notches in CDMA signaling, such as OFDM reference signals used in channel estimation.

FIG. 10 shows an example use for notches in CDMA signaling. Frequency graph 1000 shows CDMA signal 1005 and OFDM signal 1010 superposed in a frequency band or channel with periodic nulls 1020 in CDMA signal 1005 and an example use of periodic nulls/notches 1020. Interference-free subcarriers may be used, for example, for a special purpose in a superposed (e.g. OFDM) signal. In an example, periodic nulls 1020 may be used to transmit periodic OFDM reference (e.g. pilot) signals 1015 used in channel estimation. Configuring interference-free subcarriers in an OFDM signal to carry reference signals may, for example, reduce or eliminate CDMA superposition interference with frequency domain channel estimation for the OFDM signal (and hence the overall superposed signal). Various implementations may make a wide variety of uses of periodic or aperiodic notches that provide full or partial orthogonality between heterogeneous or homogeneous superposed signals.

Figures 11A, 11B:
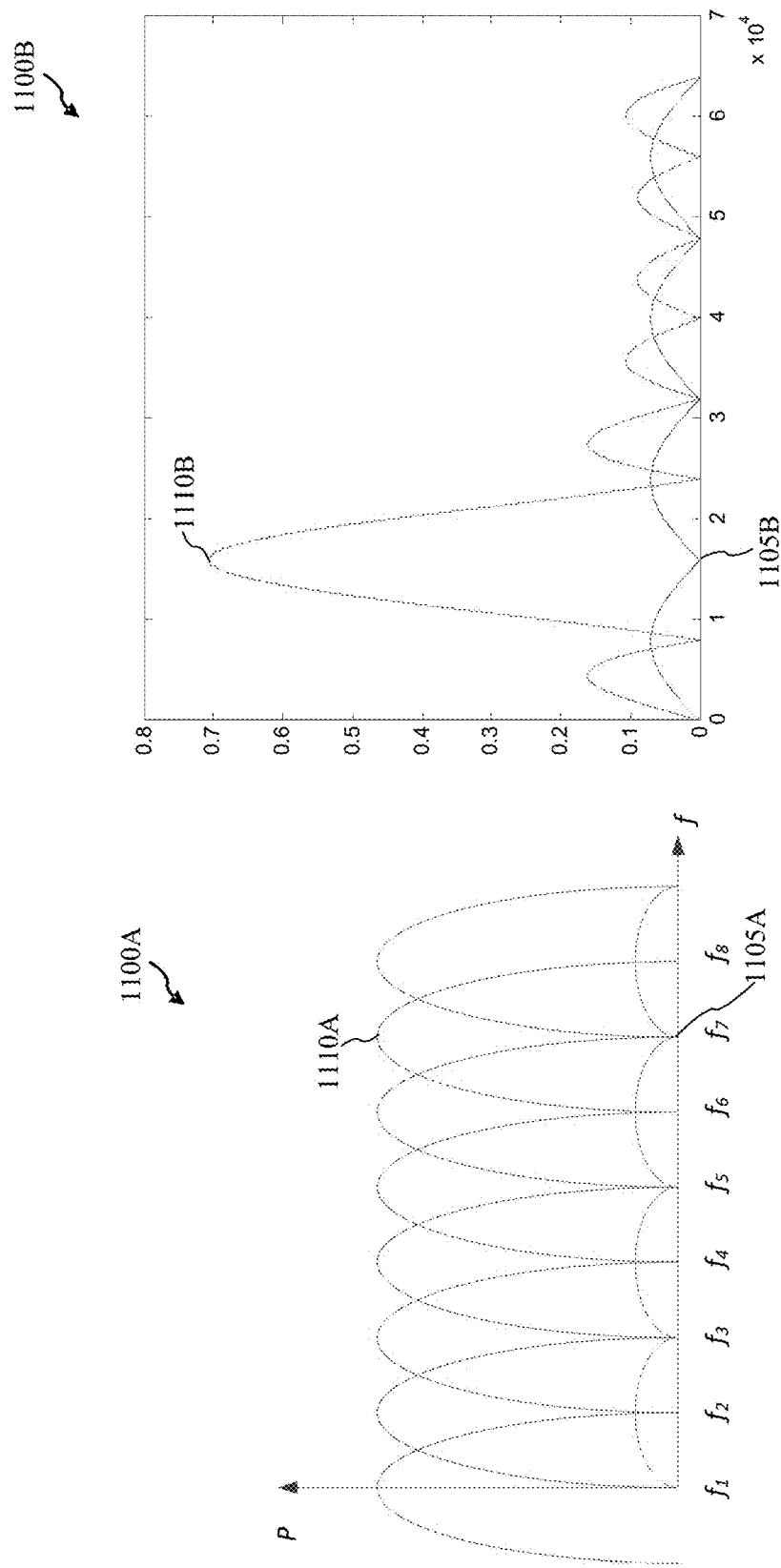
FIG. 11A illustrates an example of partially orthogonal superpositioning where certain OFDM subcarriers are not interfered with by a CDMA signal.
FIG. 11B illustrates an example PSD for partially orthogonal signaling.

FIG. 11A illustrates an example of partially orthogonal superpositioning where certain OFDM subcarriers are not interfered with by a CDMA signal. Frequency graph 1100A shows CDMA signal 1105A and OFDM signal 1110A superposed in a frequency band or channel with periodic nulls/notches, e.g., given exclusion of certain CDMA modulation codes, in CDMA signal 1105A at OFDM subcarriers f1, f3, f5, and f7. Various implementations may have a wide variety of coordinated code exclusions and/or subcarrier selections to obtain periodic or aperiodic notches that provide full or partial orthogonality between heterogeneous or homogeneous superposed signals.

FIG. 11B illustrates an example PSD for partially orthogonal signaling. PSD graph 1100B shows the PSD of an OFDM signal 1110B having a subcarrier loaded with data superimposed with a CDMA signal 1105B. The power of CDMA signal 1105B is zero at the frequency sampling point of the subcarrier in OFDM signal 1110B being used for data transmission.

Figure 12:
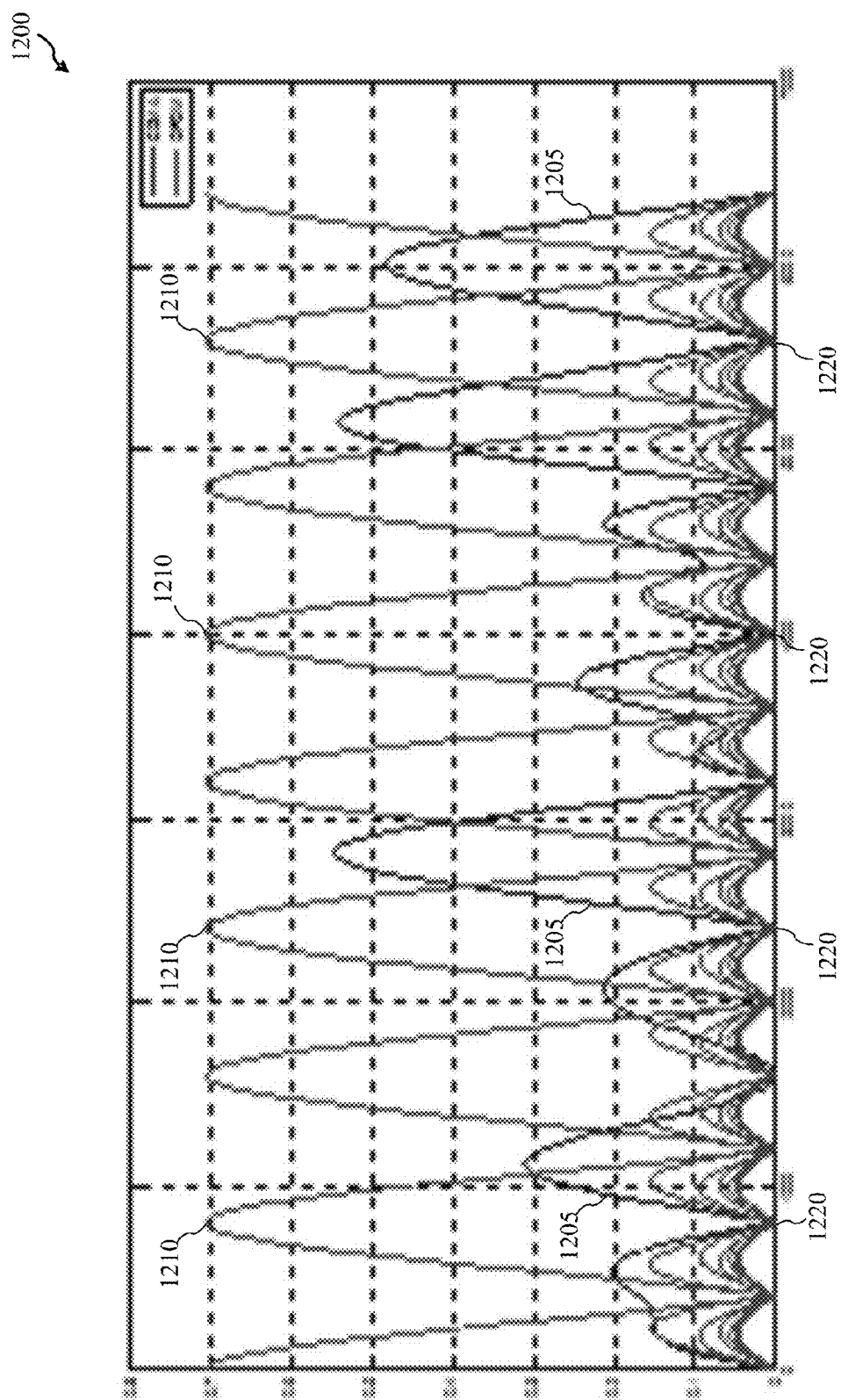
FIG. 12 illustrates an example PSD for orthogonal signaling.

FIG. 12 illustrates an example PSD for orthogonal signaling. PSD graph 1200 shows PSD for CDMA signal 1205 and PSD per-subcarrier for OFDM signal 1210. Full orthogonality between CDMA signal 1205 and OFDM signal 1210 may also be created, for example, using the spectral property of the Hadamard code. In an example, superposed waveforms may be orthogonal, for example, when the first N/2 codes are excluded from CDMA signal 1205 and even subcarriers (e.g. counting from 1) of OFDM signal 1210 are not used for data transmission. In the example shown, N=16. Various implementations of heterogeneous and homogeneous superpositioning may achieve full or partial orthogonality using a variety of techniques.

Interference shaping may also improve superpositioning performance. In an example of OFDM/CDMA signal superpositioning, a CDMA signal may have lower power compared to an OFDM signal. A CDMA signal may create interference on OFDM subcarriers that are modulated with specific I/Q modulation. A CDMA waveform may be used at a fractional rate compared to OFDM. Some modulation codes may be utilized while other codes are left unused (e.g. some may be excluded for nulling and/or some may be reserved for shaping).

Performance of a superpositioning system may be improved, for example, by using reserved codes to create correlated CDMA interference on OFDM subcarriers, e.g., to reduce or minimize the effect of CDMA interference on OFDM demodulation. The overall contribution of CDMA interference on OFDM data symbols may be manipulated so that the superposed symbol on each subcarrier may fall further (e.g. as far as possible) from regions within decision boundaries on a constellation plot. Interference shaping may, for example, distort, redistribute or re-center interference relative to OFDM constellation points. This type of interference shaping may be referred to as correlated interference. Where CDMA interference is being manipulated, for example, correlated interference may be referred to as correlated CDMA interference.

A family of unused or reserved codes may be denoted as $C_r$, which may be an N×R reserved code matrix spanned by the remaining N−M code set, where M is the number of codes for CDMA data transmission. Reserved codes may be used for various purposes, e.g., to improve performance for an OFDM signal superposed with a CDMA signal.

A transmitted block containing an OFDM signal and a CDMA signal may be expressed in the frequency domain in accordance with Eq. 3.

$$y=\sqrt{P\alpha}x_1+\sqrt{P(1-\alpha)}F(C_dx_2+C_rx_r) \qquad \text{Eq. 3}$$

In Eq. 3, P is the total transmit power, α is the ratio of far user (e.g. OFDM) signal power to total transmission power, F is an N×N DFT matrix and $C_d$ is an N×M data code matrix where M is the number of codes utilized for CDMA data. An M/N ratio denotes a rate ratio of the CDMA signal to the OFDM signal. $x_1$ is an N×1 vector containing I/Q data symbols for a far user (e.g. OFDM). $x_2$ is an M×1 vector containing I/Q data symbols for a near user (e.g. CDMA). $x_r$ is R×1 vector containing complex numbers mapped to the corresponding R codes. CDMA data symbols ($x_2$) may be mutually independent from OFDM data symbols ($x_1$). This, for example, may make the CDMA interference components on each OFDM subcarrier circularly symmetric in the I/Q plane. In other words, CDMA data in the frequency domain may approach the complex Gaussian distribution due to central limit theorem. In other examples, superposed heterogeneous and homogeneous signals may be expressed differently than Eq. 3.

FIG. 13A illustrates an example of QPSK (4QAM) constellations of an OFDM signal and interference by an uncorrelated CDMA signal. Constellation plot 1300A shows an example of independent CDMA interference 1310A surrounding OFDM signal constellation points, e.g. constellation point 1305A, for each modulated OFDM symbol.

FIG. 13B illustrates QPSK constellations of an OFDM signal and interference by a correlated CDMA signal. Constellation plot 1300B shows an example of reshaped CDMA interference 1310B relative to OFDM signal constellation points, e.g. constellation point 1305B, for each modulated OFDM symbol. Reshaped CDMA interference 1310B has redistributed independent CDMA interference, for example, by recentering CDMA interference away from OFDM signal constellation points, e.g. constellation point 1305B. OFDM constellation points may be alternatively or additionally moved, e.g., away from CDMA interference, by applying one or more types of correlated interference. In an example, constellation points may be towards the perimeter of correlated interference, e.g., as shown in FIG. 13B.

Determining a corresponding $x_r$ vector may be accomplished, for example, using linear optimization methods as a function of the OFDM and CDMA data to be transmitted. Auxiliary data may be selected for superposed transmission to generate one or more types of correlated interference. In an example, an auxiliary variable t may be defined as the magnitude of reduction of the distance between OFDM symbols after correlated CDMA interference.

FIG. 13C illustrates an example of 16QAM constellations of an OFDM signal and interference by an uncorrelated CDMA signal. Constellation plot 1300C shows an example of independent CDMA interference 1310C surrounding OFDM signal constellation points, e.g. constellation point 1305C, for each modulated OFDM symbol.

FIG. 13D illustrates 16QAM constellations of an OFDM signal and interference by a correlated CDMA signal. Constellation plot 1300D shows an example of reshaped CDMA interference 1310D relative to OFDM signal constellation points, e.g. constellation point 1305D, for each modulated OFDM symbol. Reshaped CDMA interference 1310D has redistributed independent CDMA interference, for example, by recentering CDMA interference away from OFDM signal constellation points, e.g. constellation point 1305D. OFDM constellation points may be alternatively or additionally moved, e.g., away from CDMA interference, by applying one or more types of correlated interference. In an example, constellation points may be towards the perimeter of correlated interference, e.g., as shown in FIG. 13D.

Determining a corresponding $x_r$ vector may be accomplished, for example, using linear optimization methods as a function of the OFDM and CDMA data to be transmitted. Auxiliary data may be selected for superposed transmission to generate one or more types of correlated interference. In an example, an auxiliary variable t may be defined as the magnitude of reduction of the distance between OFDM symbols after correlated CDMA interference.

The dots in FIGS. 13A-D and FIGS. 14A-B represent transmitted or desired received constellation points. Any point in the shaded region around a constellation point represents the received constellation points, which may not be the same as the desired constellation point due to interference from the CDMA signal. The points in the shaded region form a distribution of the interference around the desired constellation point. Interference shaping may reshape the interference distribution so that the boundaries of shaded regions are further apart from each other, which may make it easier for a receiver to reach a correct decision on which constellation point a transmitter used.

Figure 14B:
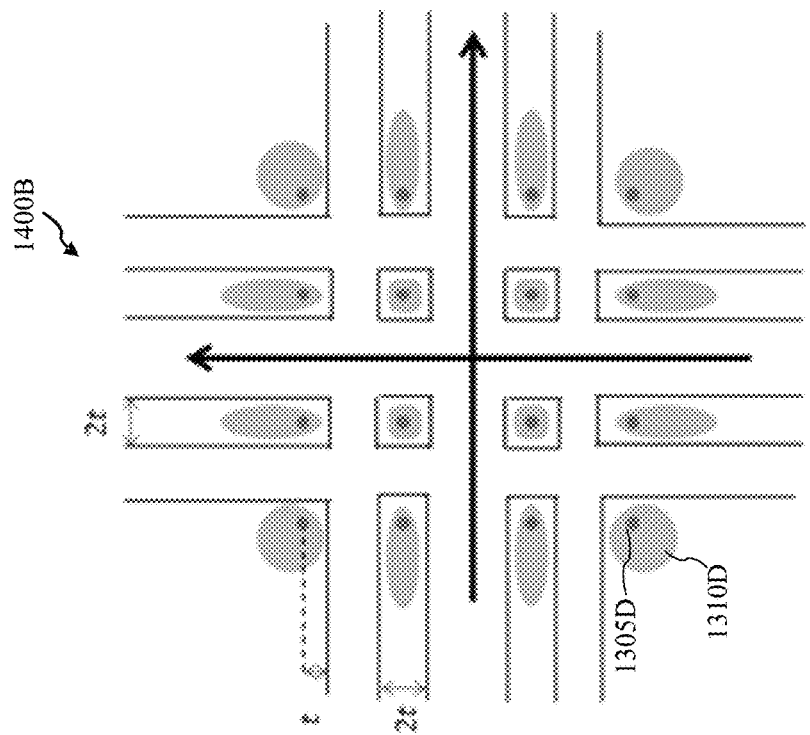
FIG. 14B illustrates an example of 16QAM constellations of an OFDM signal and correlated interference.
Figure 14A:
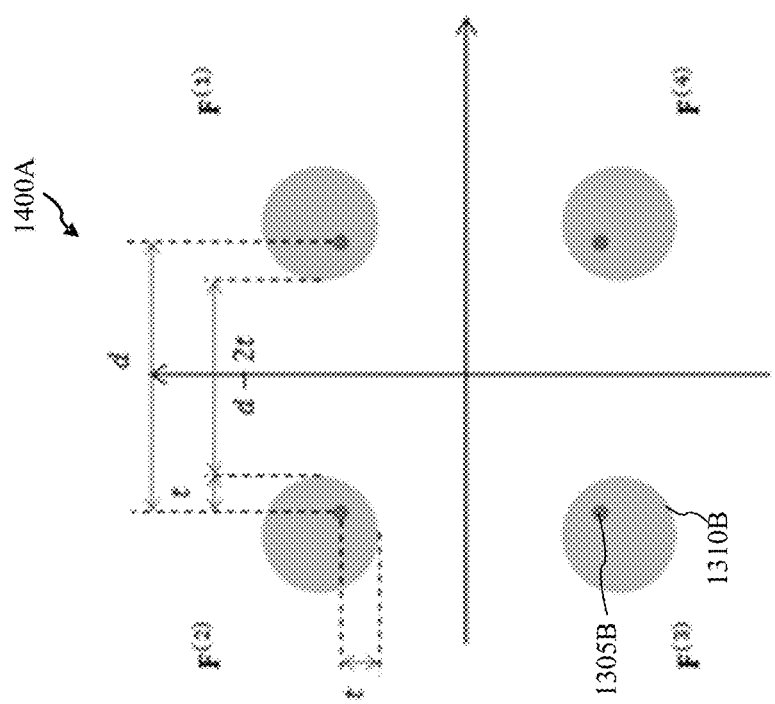
FIG. 14A illustrates an example of QPSK constellations of an OFDM signal and correlated interference.

FIG. 14A illustrates an example of QPSK constellations of an OFDM signal and correlated interference. FIG. 14A depicts the magnitude of reduction of distance between received OFDM constellation points after correlated CDMA interference on OFDM subcarriers with QPSK modulation. Correlated CDMA interference may reduce distance t, e.g., minimize the reduction of the distance between constellation points of QPSK symbols that the OFDM subcarrier modulated. The distance between the OFDM constellation points (e.g. d in FIG. 14A) may be fixed. Distance t may be indirectly used to measure the distance between two interfered OFDM symbols (e.g. d-2t in FIG. 14A).

In an example, an assumption may be made that a 12th OFDM subcarrier has a QPSK symbol of (−0.707+j0.707), e.g., a second quadrant symbol. Based on this assumption, optimization may be expressed as a set of constraints in Eq. 4.

$$\min_{x_r} t \qquad \text{Eq. 4}$$
$$\text{s.t.: } \mathcal{R}\{x_1(12) + f^{(12)}(C_d x_N + C_r x_r)\} < -0.707 + t$$
$$\mathcal{J}\{x_1(12) + f^{(12)}(C_d x_N + C_r x_r)\} > 0.707 - t$$

In Eq. 4, $f^{(12)}$ is the 12th row of the DFT matrix, which only takes the contribution of the CDMA signal on 12th subcarrier. Given that $x_1(12)=-0.707+j707$, each side of the inequality may be simplified by removing equivalents from both sides for in-phase and quadrature portions. The result may be expressed as a set of constraints in Eq. 5.

$$\mathcal{R}\{f^{(12)}(C_d x_N + C_r x_r)\} < t$$
$$\mathcal{J}\{f^{(12)}(C_d x_N + C_r x_r)\} > -t \qquad \text{Eq. 5}$$

Considering the subcarriers and the four quadrants in QPSK, four different constraints in the optimization may be expressed as a set of constraints in Eq. 6.

$$\min_{x_r} t \qquad \text{Eq. 6}$$

-continued s.t.: $\mathcal{R}\{F^{(1)}(C_d x_N + C_r x_r)\} > -t1$ $\mathcal{J}\{F^{(1)}(C_d x_N + C_r x_r)\} > -t1$ $\mathcal{R}\{F^{(2)}(C_d x_N + C_r x_r)\} < t1$ $\mathcal{J}\{F^{(2)}(C_d x_N + C_r x_r)\} > -t1$ $\mathcal{R}\{F^{(3)}(C_d x_N + C_r x_r)\} < t1$ $\mathcal{J}\{F^{(3)}(C_d x_N + C_r x_r)\} < t1$ $\mathcal{R}\{F^{(4)}(C_d x_N + C_r x_r)\} > -t1$ $\mathcal{J}\{F^{(4)}(C_d x_N + C_r x_r)\} < t1$ $\mathcal{R}\{x_r\} < x_{up} 1$ $\mathcal{J}\{x_r\} < x_{up} 1$ In Eq. 6, $F^{(k)}$ is a matrix containing the rows of the DFT matrix on which the ith quadrant QPSK symbol is modulated. $x_{up}$ is the upper power limit for the reserved codes. In another example or alternative embodiment, the total power allocated to the reserved codes may be constrained, e.g., $x_r^H x_r < P_r$.

The set of constraints in Eq. 6 may be restated and concatenated into a single matrix for both in-phase and quadrature portions. The linear optimization problem may be restated in a standard form in accordance with Eq. 7.

$$\min \begin{bmatrix} 0^T & 1 \end{bmatrix} \begin{bmatrix} x_r \\ t \end{bmatrix} \quad \text{Eq. 7}$$

$$\text{s.t.: } \mathcal{R}\left\{\begin{bmatrix} D_R F C_r & -1 \\ 1 & 0 \end{bmatrix}\begin{bmatrix} x_r \\ t \end{bmatrix}\right\} < \mathcal{R}\left\{\begin{bmatrix} D_{R2} F C_d x_2 \\ x_{up} 1 \end{bmatrix}\right\},$$

$$\mathcal{J}\left\{\begin{bmatrix} D_R F C_r & -1 \\ 1 & 0 \end{bmatrix}\begin{bmatrix} x_r \\ t \end{bmatrix}\right\} < \mathcal{J}\left\{\begin{bmatrix} D_{I2} F C_d x_2 \\ x_{up} 1 \end{bmatrix}\right\}$$

In Eq. 7, $D_R$, $D_{R2}$, $D_I$, $D_{I2}$ are diagonal sign matrices that determine the sign of the corresponding row of the Fourier matrix as a function of OFDM data on which the CDMA interference is being optimized. The sign of a particular diagonal element may determine the desired direction of the CDMA interference on a particular subcarrier as a function of the OFDM symbol on that subcarrier.

FIG. 14B illustrates an example of 16QAM constellations of an OFDM signal and correlated interference. The example discussed for QPSK modulation may be extended to 16-QAM modulation with nine distinct constellations for CDMA interference. There were four distinct constellations for QPSK modulation constrained from only 2 sides. In an example for 16QAM, there may be four points constrained from two sides (corner points), eight points constrained from three sides (edge points, two points on each edge) and/or four points constrained from four sides (inner points). These constraints may be observed in FIG. 14B, which depicts correlated CDMA interference that may be applied to OFDM constellation points in OFDM subcarriers with 16QAM modulations.

Figure 15:
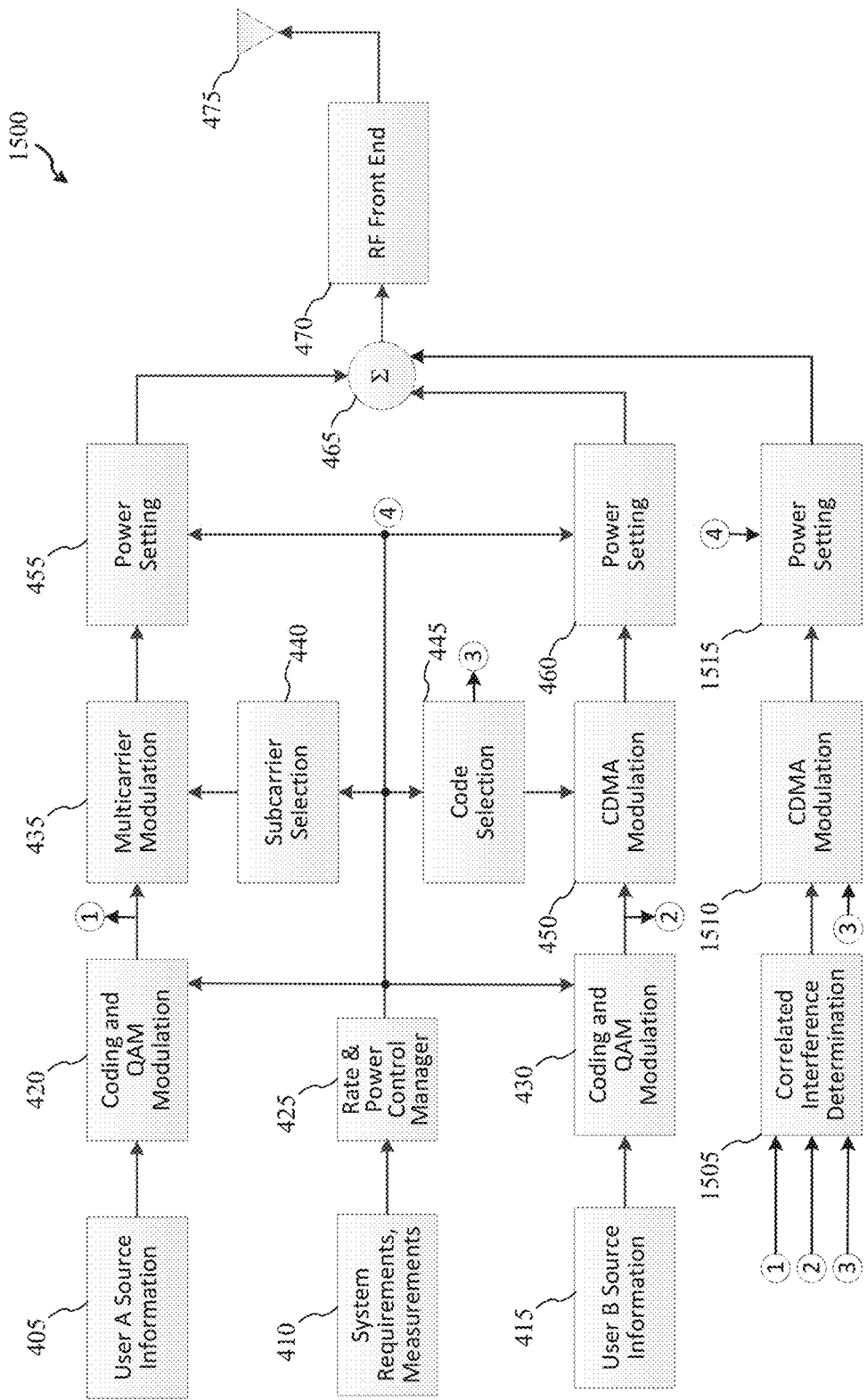
FIG. 15 shows an example of an OFDM and CDMA superpositioning transmitter with interference shaping that transmits superposed signals with correlated interference.

FIG. 15 shows an example of an OFDM and CDMA superpositioning transmitter with interference shaping that may transmit superposed signals with correlated interference. Example superpositioning transmitter 500 is presented by adding an example of interference shaping to example transmitter 400 in FIG. 4, although one or more correlated interference schemes may be implemented in any superpositioning implementation.

As shown in FIG. 15, correlated interference determination 1505 may receive and may utilize OFDM symbols $x_1$ (denoted as 1) generated by OFDM coding and QAM modulation 430, CDMA symbols $x_2$ (denoted as 2) generated by CDMA coding and QAM modulation 430 and selected codes used for CDMA data transmission $C_d$ (denoted as 3) generated by code selection 445. Additional or alternative information may be utilized in other examples of correlated interference data determinations. Correlated interference determination 1505 may determine a correlated interference $x_r$. CDMA modulation 1510 may receive and apply CDMA modulation to a correlated interference determination to generate a correlated interference signal. Reserved codes $C_r$ (i.e. codes used to transmit the correlated interference) may be implicitly determined from selected codes used for CDMA data transmission $C_d$. Correlated interference $x_r$ may be modulated on the reserved codes. Correlated interference power setting 1515 may select a power level for the correlated interference signal. Correlated interference power setting 1515 may be controlled by a control signal from rate and power control manager (denoted as 4). The correlated interference signal may be provided to summation 465 for superpositioning with CDMA and OFDM signals before or during transmission by one or more collocated or distributed transmitters.

Shaping interference may, for example, reduce an error rate for the OFDM signal at the near receiver, which may help reduce CDMA errors due to error propagation at the near user. Similarly, correlated interference may reduce the OFDM error rate at the far user, for example, given that the far user may demodulate the OFDM signal by treating CDMA as interference.

Figure 16:
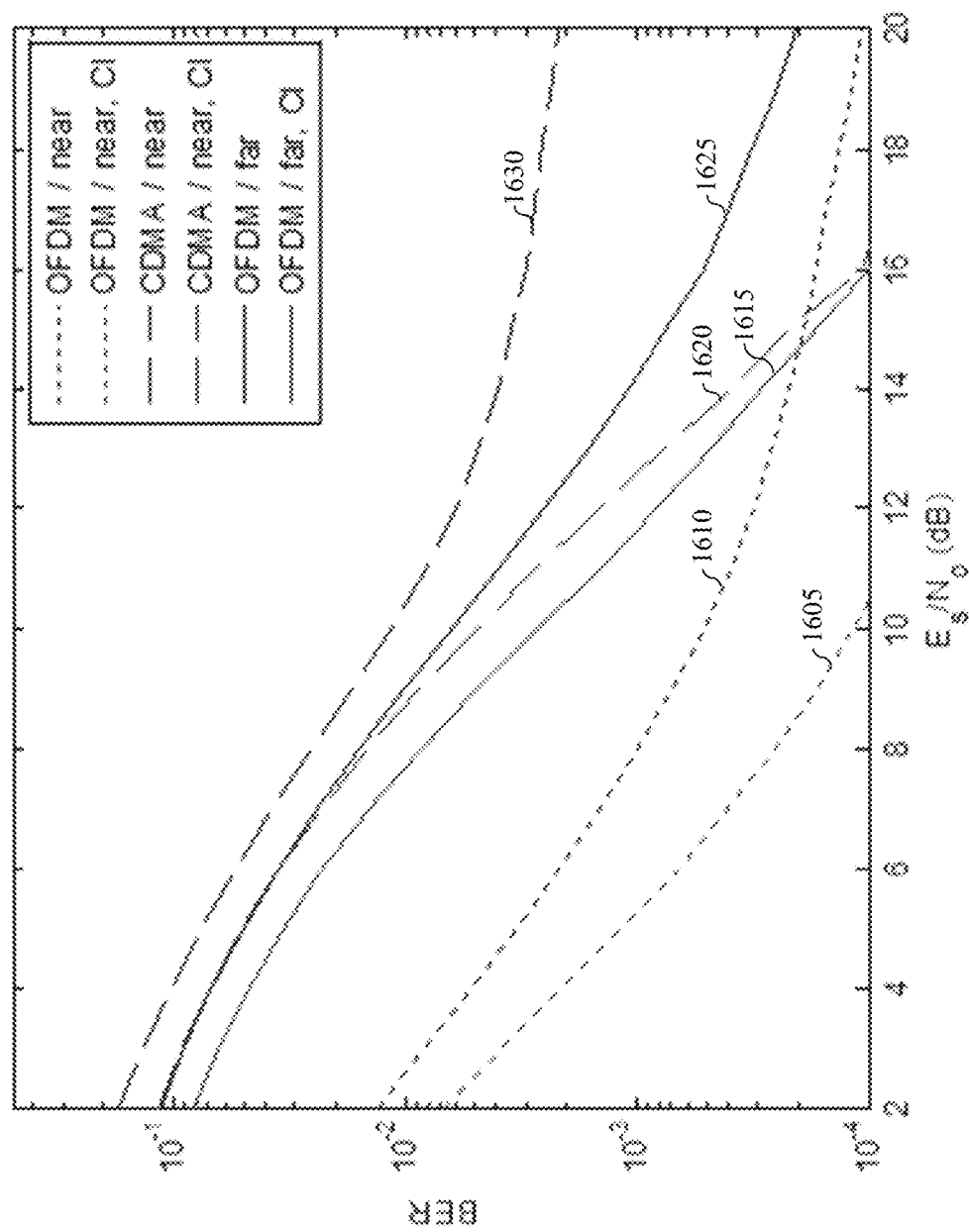
FIG. 16 illustrates an example of error rate simulation results for near and far signals with and without correlated interference.

FIG. 16 illustrates bit error rate (BER) simulation results for near and far signals with and without correlated interference. The simulation results are based on QPSK modulation, near/far user path loss difference set at 8 dB, CDMA signal SINR set at 10 dB, OFDM signal SINR set at 7 dB, N=64, M=16 and α=0.81.

BER graph 1600 shows BER for a near OFDM receiver, a far OFDM receiver and a near CDMA receiver. Short-dashed line 1610 shows the BER for a near OFDM receiver that receives a superposed signal without correlated interference. Short-dashed line 1605 shows the BER for a near OFDM receiver that receives a superposed signal with correlated interference. Solid line 1625 shows the BER for a far OFDM receiver that receives a superposed signal without correlated interference. Solid line 1615 shows the BER for a far OFDM receiver that receives a superposed signal with correlated interference. Dashed line 1630 shows the BER for a near CDMA receiver that receives a superposed signal without correlated interference. Dashed line 1620 shows the BER for a near CDMA receiver that receives a superposed signal with correlated interference. Each of the three simulated comparisons show a reduction in BER with correlated interference (CI). Various heterogeneous and homogeneous superpositioning implementations may reduce BER more, the same or less than shown for receivers at various positions receiving superposed signals with one or more correlated interference schemes.

Signaling in support of waveform superpositioning may be provided to one or more receivers that receive superposed signals. Superpositioning, interference nulling and/or interference reshaping may be supported by control signaling. For CDMA users, a base station may communicate, for example, a code length (spreading factor) and/or code indices for data and other special information, such as a pilot signal. In 3GPP WCDMA, for example, code indices and length for primary and secondary pilots may be static. A primary pilot may use C(0,512), which is a first ($0^{th}$) code with spreading factor 512. Different codes with different code length may be used in waveform superposition scenarios, for example, given that C(0, 512) may be used for interference nulling and/or interference reshaping and given that the length of the code may need to be aligned with the number of subcarriers of the OFDM signal.

Information about a first signal (e.g. OFDM signal) may be signaled to receivers of superposed signals (e.g. CDMA receivers). Signaled information may support the use of successive interference cancellation of a first (e.g. OFDM) signal by receivers (e.g. CDMA receivers), e.g., as shown in CDMA receiver 500. Information may comprise, for example, (a) allocation of subcarriers that have data transmitted, (b) modulation type (e.g. QPSK or 16QAM) used to form the complex symbols on those subcarriers and/or (c) a power ratio between OFDM and CDMA signals. Power ratio information may be used to assist a receiver (e.g. CDMA receiver) with cancellation of a superposed signal and/or interference.

Information about a second signal (e.g. CDMA signal) may be signaled to receivers of superposed signals (e.g. OFDM receivers). Signaled information may support the use of successive interference cancellation of the CDMA signal in OFDM receivers, e.g. as shown in OFDM receiver 600B. Information may comprise, for example, (a) code length (spreading factor), (b) code indices, (c) modulation type for each code and/or (d) a power ratio between the OFDM and CDMA signals. Power ratio information may be used to assist a receiver (e.g. OFDM receiver) with cancellation of a superposed signal and/or interference.

Figure 17:
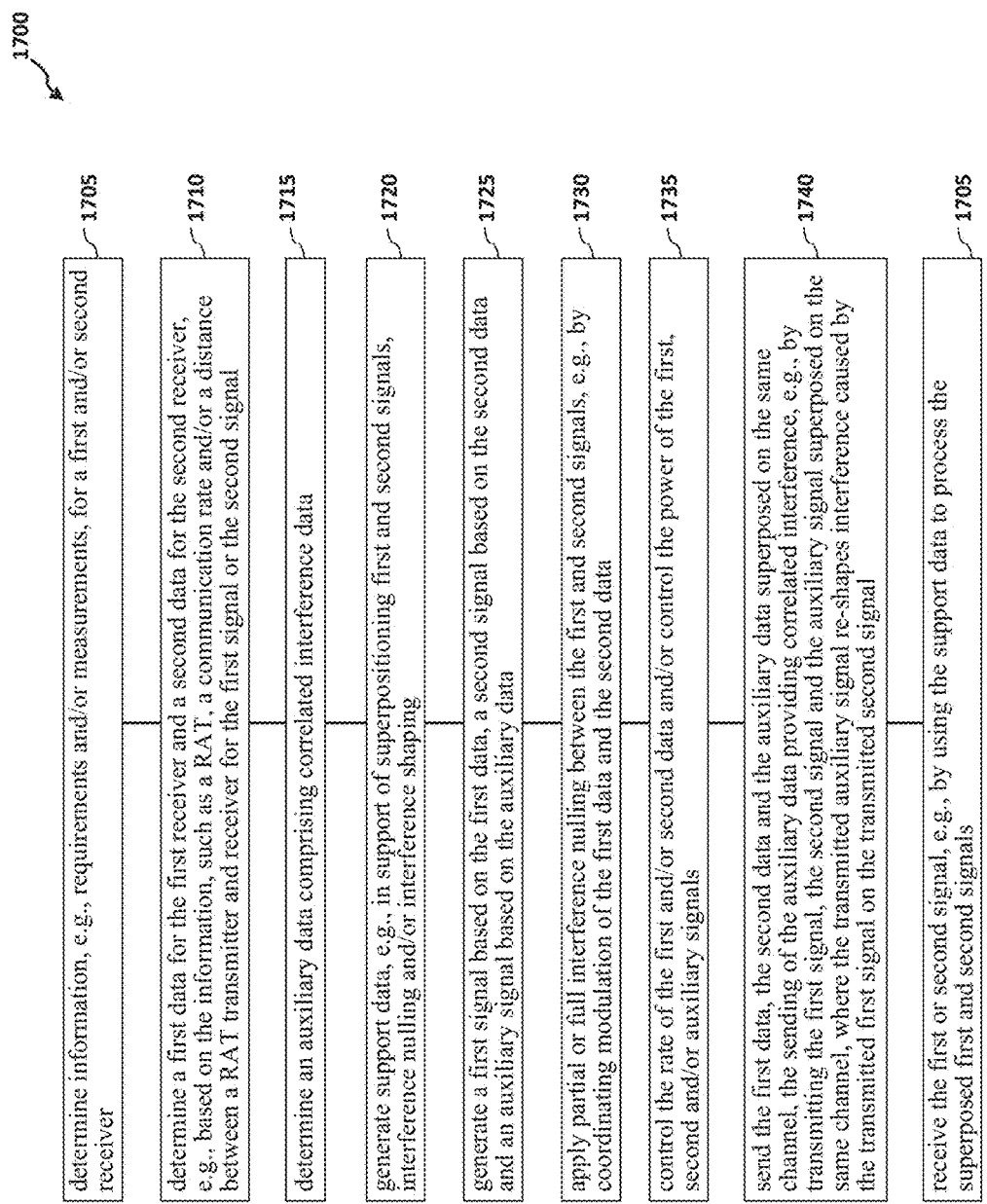
FIG. 17 illustrates an example superpositioning procedure.

FIG. 17 illustrates an example superpositioning procedure. No order is required unless expressly indicated or inherently required. There is no requirement that all or part of example procedure 1700 be implemented. Example procedure 1700 is simply one of many possible procedures. Examples and embodiments may operate in accordance with part or all of example procedure 1700 and/or part or all of other superpositioning procedures. Other structural and operational examples and implementations will be apparent to persons skilled in the relevant art(s).

Information, e.g., requirements and/or measurements, for a first and/or second receiver, may be determined 1705. For example, as shown in an example in FIG. 4, system requirements, measurements 410 may be provided to a superposition manager 425 for transmitter 400.

A determination 1710 may be made that identifies or selects a first data for a first receiver and a second data for a second receiver. A determination may, for example, be based on a RAT, a communication rate and/or a distance between a RAT transmitter and receiver for the first signal or the second signal. For example, as shown in an example in FIG. 4, user A source information 405 and user B source information 415 may be identified and/or selected for superpositioning.

A determination 1715 may be made to identify an auxiliary data comprising correlated interference data. For example, as shown in FIG. 15, auxiliary data may be determined by correlated interference determination 1505.

Support data may be generated 1720, for example, in support of superpositioning first and second signals, interference nulling and/or interference shaping. Support data may be transmitted to one or more receivers, e.g., by transmitter 400.

A first signal based on the first data, a second signal based on the second data and an auxiliary signal based on the auxiliary data may be generated 1725. For example, as shown in an example in FIG. 15, user A coding and QAM modulation 420 and multicarrier modulation 435 generates a first signal based on the first data 405, user B coding and QAM modulation 430 and CDMA modulation 450 generates a second signal based on the second data 415 and CDMA modulation 1510 generates an auxiliary signal based on auxiliary data determined by correlated interference determination 1505.

A partial or full interference nulling may be applied 1730 between the first and second signals, e.g., by coordinating modulation of the first data and the second data. For example, as shown in an example shown in FIG. 4, superposition manager 425 may implement interference nulling by coordinating subcarrier selection 440 and spreading code selection 445.

A rate of the first and/or second data and/or a power level of the first, second and/or auxiliary signals may be controlled 1735. For example, as shown in an example in FIG. 4, superposition manager (e.g. rate and power control manager) 425 may control the symbol rates for user A coding and QAM modulation 420 and user B coding and QAM modulation 430.

The first data, the second data and the auxiliary data may be sent 1740 superposed on the same channel. The sending of the auxiliary data may provide correlated interference, for example, by transmitting the first signal, the second signal and the auxiliary signal superposed on the same channel. The transmitted auxiliary signal may re-shape interference caused by the transmitted first signal on the transmitted second signal. For example, as shown in an example in FIG. 15, transmitter 1500, which may comprise one or more collocated or distributed transmitters, superposes 465 and transmits via antenna(s) 475, user A source information 405, user B source information 415 and correlated interference data determined by correlated interference determination 1505. Transmitter 1500 may be implemented in one or more components in WTRU 102 including, but not limited to, transceiver 120, processor 118, transmit/receive element 122, non-removable memory 130 and removable memory 132 as described herein with respect to FIG. 1B. Transmitter 1500 may be implemented in a Node-B, an eNode-B, a base station and/or other network entity/entities described herein with respect to FIGS. 1C, 1D and 1E.

The first or second signal may be received 1745, for example, by using the support data to process the superposed first and second signals. For example, as shown in an example in FIG. 5, CDMA receiver 500, or, as shown in an example in FIG. 6B, OFDM receiver 600B may utilize support information to successively receive or cancel a superposed signal intended for another receiver to receive an intended signal.

Examples presented may assume that superposed signals (e.g. CDMA and OFDM signals) are transmitted from the same transmission source, e.g., base station. However, superposition of multiple (e.g. two or more) waveforms is also applicable to operating conditions or configurations where multiple waveforms are transmitted from multiple sources (e.g. different BSs), which may be collocated or distributed in different locations. Multiple transmission sources may engage in signaling, such as signaling described above, to support operation or improve performance.

Systems, methods and instrumentalities have been disclosed for superposed signaling for bandwidth efficiency in wireless communications. Homogeneous and heterogeneous signals may be superposed on the same channel. Superposed signals may comprise, for example, multi carrier, frequency division and code division signals, including multiple access, e.g., orthogonal frequency division multiple access (OFDMA) and code division multiple access (CDMA), signals. Data for various receivers may be dynamically selected for signal superpositioning, for example, based on radio access technology, communication rate (e.g. high and low rates), distance between transmitter and receiver (e.g. near and far signals). Communication rate and power may be allocated to superposed signals. Interference nulling may be applied, for example, by selecting or excluding spreading codes and/or subcarriers. Nulled locations may be used to transmit critical information, e.g. reference or pilot information. Interference shaping may be applied to modify interference, e.g., by transmitting interference symbols using reserved spreading codes. Support information, e.g., code indices, code length and/or subcarriers, may be signaled to support or optimize performance.

The processes and instrumentalities described herein may apply in any combination, may apply to other wireless technologies, and for other services.

A UE may refer to an identity of the physical device, or to the user's identity such as subscription related identities, e.g., MSISDN, SIP URI, etc. UE may refer to application-based identities, e.g., user names that may be used per application.

The processes and instrumentalities described herein may be implemented in hardware (digital and/or analog), software and/or firmware, including computer program products (e.g. computer readable media) comprising logic stored on any discrete or integrated computer readable medium(s) having computer executable instructions that, when executed by one or more processors, provide and/or maintain one or more aspects of functionality described herein. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a UE, terminal, base station, RNC, and/or any host computer.

What is claimed:

1. A network entity for superposed signaling, the network entity comprising:
 a memory; and
 a processor, the processor configured to perform functions including:
  generating an orthogonal frequency division multiplexed (OFDM) signal based on first data for transmission to a first receiver, wherein the OFDM signal uses a plurality of constellations each comprising a respective plurality of constellation points;
  generating a code division multiple access (CDMA) signal based on second data for transmission to a second receiver;
  generating a shaping signal, based on predetermined correlated interference data, using reserved CDMA codes such that when the shaping signal, the OFDM signal, and the CDMA signal are superposed together, the shaping signal reshapes a distribution of interference relative to each of the respective plurality of constellation points of a corresponding one of the plurality of constellations of the OFDM signal so as to reduce the interference in a direction of one or more neighboring constellation points of the corresponding constellation, the interference being an interference created on the OFDM signal by the CDMA signal;
  generating a superposed signal to be transmitted on a channel to the first receiver and the second receiver by superposing the OFDM signal, the CDMA signal, and the shaping signal; and
  transmitting the superposed signal on the channel to the first receiver and the second receiver.

2. The network entity of claim 1, wherein the CDMA signal is generated using selected CDMA codes and the OFDM signal is generated using selected subcarriers, and wherein at least one of the selected CDMA codes and the selected subcarriers provide partial or whole orthogonality between the OFDM signal and the CDMA signal.

3. The network entity of claim 2, wherein one or more of the selected subcarriers carry a reference signal.

4. The network entity of claim 1, wherein the predetermined correlated interference data is predetermined based on the first data, the second data, and one or more selected CDMA codes used to generate the CDMA signal.

5. The network entity of claim 1, wherein the processor is further configured to perform functions of:
 allocating at least one of a first power and a first rate to the OFDM signal;
 allocating at least one of a second power and a second rate to the CDMA signal; and
 allocating at least one of an auxiliary power and an auxiliary rate to the shaping signal.

6. The network entity of claim 1, wherein the processor is further configured to perform functions of:
 transmitting a control signal that provides support for at least one of an interference nulling by a transmitter, an interference reshaping by the transmitter, or a successive interference cancellation by the first receiver or the second receiver.

7. The network entity of claim 1, wherein the processor is further configured to perform functions of:
 determining the first data for the first receiver and the second data for the second receiver by selecting the first data and the second data based on at least one of a radio access technology (RAT), a communication rate, and a distance between a respective RAT transmitter and the first receiver or the second receiver.

8. A method for superposed signaling, the method comprising:
 generating, via a network entity, an orthogonal frequency division multiplexed (OFDM) signal based on first data for transmission to a first receiver, wherein the OFDM signal uses a plurality of constellations each comprising a respective plurality of constellation points;
 generating a code division multiple access (CDMA) signal based on second data for transmission to a second receiver;
 generating a shaping signal, based on predetermined correlated interference data, using reserved CDMA codes such that when the shaping signal, the OFDM signal, and the CDMA signal are superposed together, the shaping signal reshapes a distribution of interference relative to each of the respective plurality of constellation points of a corresponding one of the plurality of constellations of the OFDM signal so as to reduce the interference in a direction of one or more neighboring constellation points of the corresponding constellation, the interference being an interference created on the OFDM signal by the CDMA signal;

generating a superposed signal to be transmitted to the first receiver and the second receiver on a channel by superposing the OFDM signal, the CDMA signal, and the shaping signal; and generating the superposed signal on the channel.

9. The method of claim 8, further comprising:

applying interference nulling to the OFDM signal by excluding one or more CDMA codes in generating the CDMA signal.

10. The method of claim 9, further comprising:

sending a signal reference information in the OFDM signal at a nulled frequency location.

11. The method of claim 8, further comprising:

sending an additional signal comprising information about at least one of a code length, selected CDMA codes used for generating the CDMA signal, one or more excluded CDMA codes, the reserved CDMA codes, and one or more code indices.

12. The method of claim 8, further comprising:

determining the first data and the second data based on at least one of a radio access technology (RAT), a communication rate, and a distance between a respective RAT transmitter and the first receiver or the second receiver.

13. A method for superposed signaling, the method comprising:

determining first data to be transmitted to a first receiver, and generating an orthogonal frequency division multiplexed (OFDM) signal based on the determined first data for transmission to the first receiver, wherein the OFDM signal uses a plurality of constellations each comprising a respective plurality of constellation points;

determining second data to be transmitted to a second receiver, and generating a code division multiple access (CDMA) signal based on the determined second data for transmission to the second receiver;

determining correlated interference data, and generating a shaping signal, based on the determined correlated interference data, using reserved CDMA codes such that when the shaping signal, the OFDM signal, and the CDMA signal are superposed together, the shaping signal reshapes a distribution of interference relative to each of the respective plurality of constellation points of a corresponding one of the plurality of constellations of the OFDM signal so as to reduce the interference in a direction of one or more neighboring constellation points of the corresponding constellation, the interference being an interference created on the OFDM signal by the CDMA signal; and generating a superposed signal to be transmitted on a channel to the first receiver and the second receiver by superposing the OFDM signal, the CDMA signal, and the shaping signal.

14. The method of claim 13, further comprising:

selecting CDMA codes to modulate the first data to generate the CDMA signal; and selecting the reserved CDMA codes to modulate the correlated interference data.

15. The method of claim 14, further comprising:

nulling interference at subcarrier locations in the OFDM signal by excluding one or more CDMA codes in generating the CDMA signal.

16. The method of claim 15, further comprising:

determining information for signaling to at least one of the first receiver and the second receiver that supports at least one of the interference reshaping and the interference nulling.

* * * * *